United States Patent
Hu et al.

(10) Patent No.: US 11,720,098 B1
(45) Date of Patent: Aug. 8, 2023

(54) SAFETY OVERRIDE SYSTEM FOR A LIFTED AUTONOMOUS MOBILE DEVICE

(71) Applicant: AMAZON TECHNOLOGIES, INC., Seattle, WA (US)

(72) Inventors: Yue Hu, San Francisco, CA (US); Roopesh Athipatla Pattabhi, Newark, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 91 days.

(21) Appl. No.: 17/303,383

(22) Filed: May 27, 2021

(51) Int. Cl.
G05D 1/00 (2006.01)
G05D 1/02 (2020.01)

(52) U.S. Cl.
CPC .......... G05D 1/0066 (2013.01); G05D 1/027 (2013.01); G05D 1/0246 (2013.01); G05D 1/0255 (2013.01); G05D 1/0272 (2013.01)

(58) Field of Classification Search
CPC .. G05D 1/0066; G05D 1/0246; G05D 1/0255; G05D 1/027; G05D 1/0272
See application file for complete search history.

(56) References Cited

U.S. PATENT DOCUMENTS

| | | | | |
|---|---|---|---|---|
| 8,961,695 B2 * | 2/2015 | Romanov | ............ | A47L 11/4011 15/340.1 |
| 9,250,081 B2 * | 2/2016 | Gutmann | ............. | G05D 1/0231 |
| 2008/0154429 A1 * | 6/2008 | Lee | .......... | G05D 1/027 901/1 |
| 2014/0009561 A1 * | 1/2014 | Sutherland | ............. | H04N 7/185 348/14.05 |
| 2019/0101926 A1 * | 4/2019 | Takaoka | ................ | G05D 1/0238 |
| 2019/0265718 A1 * | 8/2019 | Lee | ........ | A01D 34/008 |
| 2020/0216129 A1 * | 7/2020 | Sutherland | ................ | A61L 2/26 |

FOREIGN PATENT DOCUMENTS

GB 2505031 A * 2/2014 ............. G01C 21/16

OTHER PUBLICATIONS

"OPT3101 ToF-Based Long-Range Proximity and Distance Sensor AFE", Texas Instruments OPT3101, SBAS883A Feb. 2018, Revised Jun. 2018, 120 pages.

* cited by examiner

Primary Examiner — Anne Marie Antonucci
Assistant Examiner — Patrick Daniel Mohl
(74) Attorney, Agent, or Firm — Lindauer Law, PLLC

(57) ABSTRACT

An autonomous mobile device (AMD) may move around while performing tasks. If the AMD is lifted, the AMD responds to ensure safety of the user, modify ongoing operation, and so forth. For example, the AMD may stop the wheels, retract a mast, or suspend navigation tasks. To accurately determine whether or not the AMD has been lifted, the AMD uses one or more sensors to determine a vertical lift distance and rotation of the AMD with respect to one or more axes. For example, while the AMD is stationary, the sensors used may include an accelerometer or a gyrometer. While the AMD is moving, data from time-of-flight sensors or one or more cameras may also be used. If the AMD is stationary low-level sensor thresholds are used. If the AMD is moving steadily, medium-level sensor thresholds are used. If the AMD is suddenly decelerating, high-level sensor thresholds are used.

20 Claims, 8 Drawing Sheets

| SCENARIO SENSOR | STATIONARY | MOVING | SUDDEN DECELERATION |
|---|---|---|---|
| ACCELEROMETER | LOW THRESHOLD-1 | MEDIUM THRESHOLD-1 | HIGH THRESHOLD-1 |
| GYROMETER | LOW THRESHOLD-2 | MEDIUM THRESHOLD-2 | HIGH THRESHOLD-2 |
| CLIFF SENSOR | N/A | MEDIUM THRESHOLD-3 | HIGH THRESHOLD-3 |

THRESHOLD DATA 120

SAFETY OVERRIDE SYSTEM FOR A LIFTED AUTONOMOUS MOBILE DEVICE

BACKGROUND

Every day, a user faces a variety of tasks both personal and professional that need to be attended to. These may include helping in the care of others, such as children or the elderly, working from home, taking care of the home, staying in contact with others, and so forth. Devices that assist in these tasks may help the user perform these tasks better or may allow the user time to attend to other tasks.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
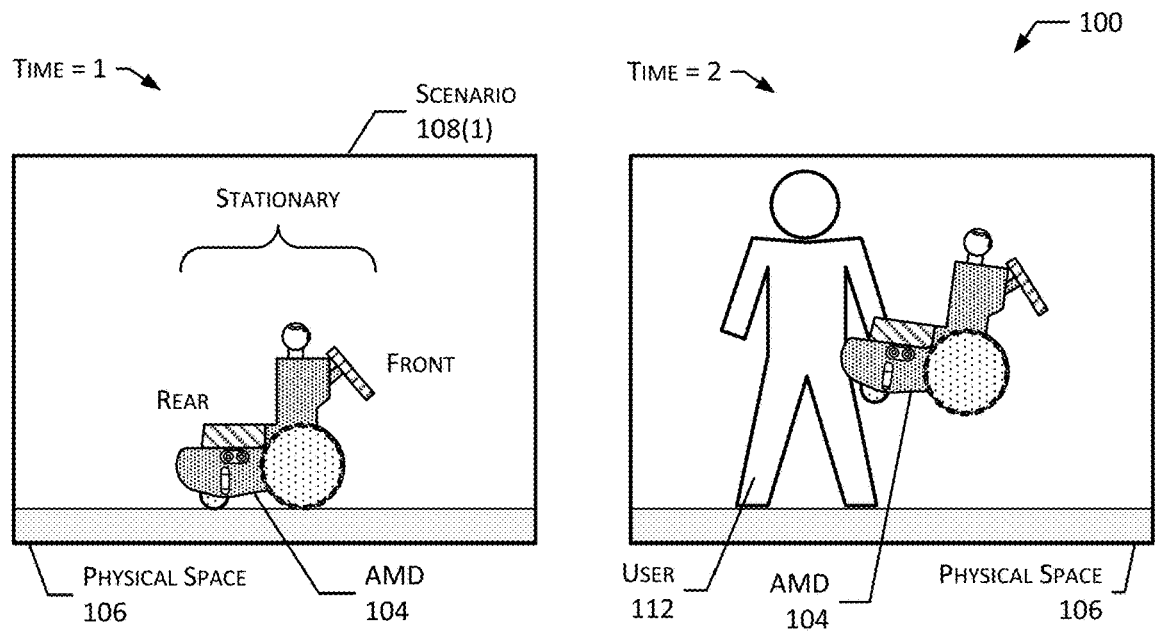
FIG. 1 illustrates a system for lift detection of an Autonomous Mobile Device (AMD), according to some implementations.
Figure 1:
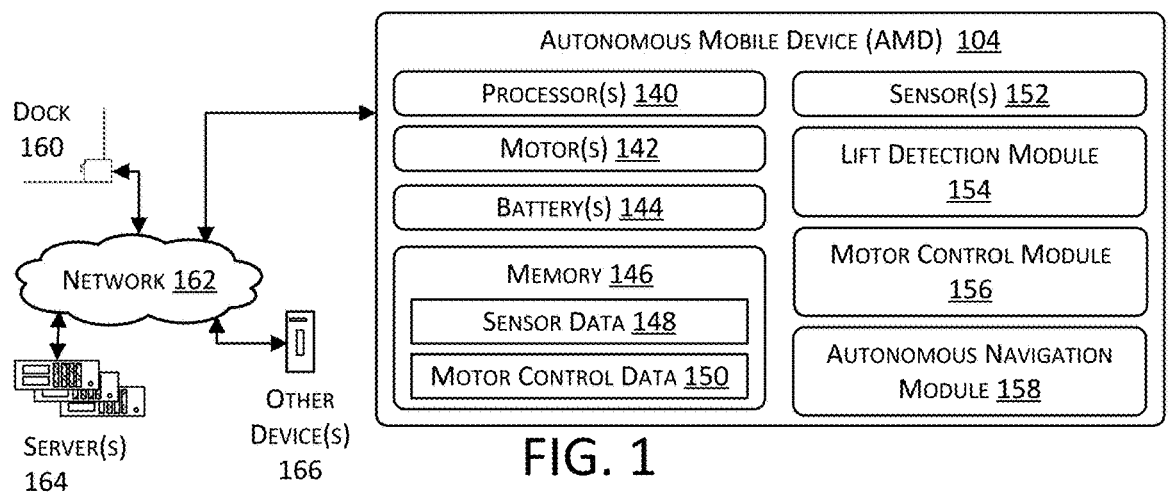

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) is a robot capable of autonomous movement from one location in a physical space to another location without being controlled by a user. A user may interact with the AMD and the AMD may perform tasks that involve displaying information, accepting input, and acquiring sensor data. The AMD may be stationary or moving in the physical space and, on occasion, the user may lift the AMD from a supporting surface such as a floor. When the AMD is lifted, one or more actions may be taken to avoid injury to a user, avoid damage to the AMD, or make the AMD easier to transport. For example, upon detecting a lift has taken place, the AMD may stop moving its wheels, manipulator arms, and so forth.

Traditionally, a contact sensor has been used to detect if a device has been lifted. However, this requires the inclusion of the contact sensor, which increases the cost of parts and complexity of manufacture of the device. A contact sensor may also fail to detect a lift or incorrectly detect a lift in several scenarios. The contact sensor may also be subject to user interference, such as a user attempting to defeat the contact sensor and maintain operation while the device is lifted.

Described in this disclosure are techniques for using data from several different sensors to determine a lift event indicative of the AMD being lifted from a supporting surface. These techniques provide more accurate and consistent determination of a lift event across different usage scenarios. The techniques use sensors that are used by the AMD for other functions, removing the need to add another sensor. As a result, the overall cost and complexity of the AMD is reduced. The use of multiple sensors to determine a lift event reduces the likelihood of a user bypassing lift detection based on a single sensor.

A lift detection module uses sensor data from various sensors to determine the occurrence of a lift event. In one implementation, the AMD may use sensor data from an accelerometer, a gyrometer, and cliff sensors. The cliff sensors may be time-of-flight sensors that have a field of view directed downward toward a floor over which the AMD is moving. In other implementations, other sensors such one or more cameras, an altimeter, ultrasonic rangefinder, and so forth may be used. Once the lift event has been determined, the AMD may take one or more actions. For example, the motors may be turned off.

The lift detection module considers at least three different scenarios for the AMD: stationary, in-motion, and sudden-deceleration. Responsive to a scenario, data from particular sensors is used with respect to sensor data thresholds associated with the scenario. The stationary scenario is associated with a set of low-level thresholds, the in-motion scenario is associated with a set of medium-level thresholds, and the sudden deceleration scenario is associated with a set of high-level thresholds. This scenario-based processing using multiple sensors results in a highly accurate determination of a lift event during any of these scenarios.

In the stationary scenario, data from accelerometers and a gyrometer is used. While stationary, the cliff sensors are not needed for navigation and may be turned off to conserve power. Because the cliff sensors are off, data from the cliff sensors is not used in the stationary scenario. In the stationary scenario, the set of low-level thresholds are used. Accelerometer data is used to determine if the AMD has been lifted greater than a low-level threshold distance. Gyrometer data is used to determine if rotation of the AMD is greater than a low-level threshold rotation. Based on the accelerometer data and the gyrometer data, the lift detection module determines whether a lift event has occurred.

In the in-motion scenario, data from an accelerometer, a gyrometer, and the cliff sensors is used. While in motion, cliff sensors are used for navigation, and cliff sensor data is available to the lift detection module. In the in-motion scenario, the set of medium-level thresholds are used. Accelerometer data is used to determine if the AMD has been lifted greater than a medium-level threshold distance.

Gyrometer data is used to determine if rotation of the AMD is greater than a medium-level threshold rotation. Cliff sensor data is used to determine if the AMD has been lifted greater than the medium-level threshold distance. Based on the accelerometer data, the gyrometer data, and the cliff sensor data, the lift detection module determines whether a lift event has occurred.

In the sudden deceleration scenario, data from an accelerometer, a gyrometer, and the cliff sensors is used. Sudden deceleration may be associated with decelerating at a rate that causes at least a portion of the AMD to lift from the ground. In the sudden deceleration scenario, the set of high-level thresholds are used. Accelerometer data is used to determine if the AMD has been lifted greater than a high-level threshold distance. Gyrometer data is used to determine if rotation of the AMD is greater than a high-level threshold rotation. Cliff sensor data is used to determine if the AMD has been lifted greater than the high-level threshold distance. Based on the accelerometer data, the gyrometer data, and the cliff sensor data, the lift detection module determines whether a lift event has occurred.

By using the systems and techniques described in this disclosure, the AMD determines a lift event more accurately based on data from different types of sensors. Because lift events are determined more accurately, the AMD is less likely to determine a lift event resulting from a user attempting to subvert lift detection. The use of sensors that are used for other purposes allows the AMD to implement lift detection without the additional complexity or cost of a dedicated sensor.

Illustrative System

FIG. 1 illustrates a system 100 for lift detection of an AMD, according to some implementations.

The AMD 104 is depicted within physical space 106. The AMD 104 is depicted in two scenarios at two different times. At a first time, time=1, in scenario 108(1), the AMD 104 is depicted as stationary and resting on a floor of the physical space 106. At a second time, time=2, the AMD 104 is depicted as being lifted by a user 112. The AMD 104 uses a lift detection module 154 to determine a lift event.

The AMD 104 may use sensor data 148 from one or more sensors 152. By using sensor data 148 from multiple sensors 152, the lift detection module 154 increases the accuracy of determining a lift event. The AMD 104 may also use motor encoder data to determine whether or not the AMD 104 is stationary or moving. A motor encoder and motor encoder data are described in greater detail below with respect to FIG. 3. The AMD 104 may include one or more sensors 152. The one or more sensors 152 may comprise one or more of: an accelerometer, a gyrometer, an inertial measurement unit (IMU), a cliff sensor, an altimeter, or a camera. In the following example, three types of sensors 152 are used, an accelerometer, a gyrometer, and cliff sensors.

The AMD 104 may use different combinations of sensors 152 based on the scenario. The AMD 104 may also use different threshold data 120 based on a given scenario. The use of threshold data 120 that is particular to a given scenario improves the accuracy of the lift detection module 154 determining a lift event under the given scenario. As depicted, threshold data 120, with respect to different sensors 152, depicts different threshold values for different scenarios. For example, while the AMD 104 is stationary, the sensors 152 used may include an accelerometer or a gyrometer. While the AMD 104 is moving, data from time-of-flight sensors or one or more cameras may also be used. If the AMD 104 is stationary, low-level sensor threshold values may be used. If the AMD 104 is moving steadily, medium-level sensor threshold values may be used. If the AMD 104 is suddenly decelerating, high-level sensor threshold values may be used. In this example, threshold values used for a stationary scenario may be less than threshold values used for a moving scenario, and threshold values used for the moving scenario may be less than threshold values used for a sudden deceleration scenario. The AMD 104 may be deemed to be decelerating if a forward speed of the AMD 104 is decreasing from a first speed at a first time to a second speed at a second time, where the second speed is less than the first speed.

In some implementations, the threshold values depicted by the threshold data 120 may be defined to be the same or different values. For example, the accelerometer thresholds may be different for different scenarios, the gyrometer thresholds may be the same for all scenarios, and the cliff sensor thresholds may be the same for all scenarios.

In some implementations, for increased accuracy in the use of thresholds for a given scenario, the AMD 104 may delay the use of threshold values for a given scenario until the AMD 104 has stabilized within the given scenario. For example, in some cases, there may be a delay between the AMD 104 determining data indicative of the AMD 104 being in a different scenario before the physical consequences of the AMD 104 being in the different scenario have stabilized. For example, if the AMD 104 is moving and suddenly decelerates, it may take a small time interval before the AMD 104 has stopped moving completely. In this example, on a sudden deceleration, the AMD 104 may stop moving one or more wheels, but the AMD 104 may physically oscillate over the small time interval before movement has stopped.

For the purposes of discussion, the stationary scenario may be considered a first state, the moving scenario may be considered a second state, and the sudden deceleration scenario may be considered a third state. In each state, the AMD 104 uses the threshold value for a given sensor as indicated by threshold data 120. In this implementation, between changes from one state to another state, the AMD 104 may let a transition time interval lapse prior to using a different threshold value for the state being transitioned into. For example, if the AMD 104 is in the first state and transitions into the second state by beginning to move, then the AMD 104 may continue to use one or more thresholds associated with the first state for a first time interval before using one or more thresholds associated with the second state. Similarly, between transitions between any two states, the AMD 104 may continue to use one or more thresholds for a state being transitioned out of before using one or more thresholds for a state being transitioned into.

In some implementations, the AMD 104 may let a transition time interval lapse prior to using different thresholds for some state transitions but not all state transitions. For example, if a state being transitioned into has higher thresholds, then the higher thresholds may be used immediately. In this example, if a state being transitioned into uses lower thresholds, then the AMD 104 may let the transition time interval lapse prior to using the lower thresholds. In this example, if the AMD 104 is transitioning from the first state to either the second state or the third state, or from the second state to the third state, then the AMD 104 may use the threshold values for the state being transitioned into immediately. In this example, if the AMD 104 is transitioning from the third state to the first state or the second state, or from the second state into the first state, then the AMD 104 may let the transition time interval lapse before using the threshold values for the state being transitioned into.

Use of different sensors may improve accuracy of lift detection. For example, an accelerometer may determine upward acceleration along a Z-axis. Based on the upward acceleration over a first time period, a first velocity over the first time period may be determined. Based on the first velocity over the first time period, a first distance moved by the AMD 104 upward along the Z-axis may be determined. However, noise may indicate upward acceleration. For example, accelerometer data may be stored if the accelerometer data indicates an acceleration greater than 1.25 m/(s*s). Such a filter improves efficiency for the lift detection module 154 because noise is not considered.

Noise in the sensor data may be caused by external sources, such as vibrating appliances or from internal sources onboard the AMD 104, such as speakers operating to produce sound. The lift detection module 154 may determine that one or more speakers are emitting sound using one or more techniques. A first technique uses audio data acquired using one or more microphones. For example, based on the audio data a sound level indicative of sound in the environment may be determined. A second technique uses information about whether the one or more speakers have been commanded to present audio data. For example, a power amplifier that drives the one or more speakers to emit sound may be commanded with an instruction specifying an output power.

In some implementation, based on determining that the one or more speakers are emitting sound, the lift detection module 154 may determine a threshold distance with respect to a distance determined using accelerometer data. This change in threshold distance may be used to minimize false detections due to noise. For example, based on determining that the one or more speakers are emitting sound, the lift detection module 154 may increase either low threshold-1, medium threshold-2, or high threshold-3 by X %. X may be determined experimentally and may be based on a volume of the emitted sound from the one or more speakers. For example, X may increase as volume increases. For example, a low volume, such as a volume below 50 decibels may be associated with an X value of 10%, and a high volume, such as a volume above or equal to 50 decibels may be associated with an X value of 20%. Similarly, based on determining that the audio data determined by the one or more microphones is indicative of a sound level above a sound level threshold, the lift detection module 154 may increase either low threshold-1, medium threshold-2, or high threshold-3 by Y %. Y may increase as a sound level increases. For example, a sound level below 50 decibels may be associated with a Y value of 10%, and a high volume, such as a sound level above or equal to 50 decibels may be associated with a Y value of 20%. In implementations in which output power is used, the output power may be used instead of the sound level.

In the event of the AMD 104 being lifted, the AMD 104 may likely tilt along one or more axes due to some amount of instability of being held in the air by a user 112. A gyrometer may determine gyrometer data indicating angular velocity about one or more axes. The gyrometer data may be used to determine radians rotated by the AMD 140 about the one or more axes. Based on using gyrometer data, a lift detection module 154 may determine a lift event if both the first distance is greater than a distance threshold and the rotation of the AMD 104 is greater than a rotation threshold.

Cliff sensors may also be used to further increase confidence in determining a lift event. For example, cliff sensors may determine cliff sensor data indicating a second distance from the AMD 104 to the floor. In some implementations, to save power, the cliff sensors may be used during motion of the AMD 104 and not used when the AMD 104 is not moving. The second distance may be used in conjunction with the first distance and the rotation of the AMD 104. For example, the lift detection module 154 may determine a lift event if the first distance is greater than a distance threshold, the second distance is greater than the distance threshold, and the rotation of the AMD 104 is greater than a rotation threshold. Otherwise, the lift detection module 154 may determine that the AMD 104 has not been lifted.

In this example, the different threshold values used by the lift detection module 154 under different scenarios for different sensors 152 are depicted by threshold data 120. In this example, there are three scenarios, "stationary", "moving", and "sudden deceleration". In different examples, additional scenarios may include an accelerating scenario, a music-playing scenario, a low-power scenario, and so forth. Threshold data 120 depicts threshold values for three sensors 152, an accelerometer, a gyrometer, and a cliff sensor. In other examples, additional sensors 152, such as the additional sensors 152 described above, may use threshold values for different scenarios. In some examples, sensor data is stored if it is above an associated threshold.

With respect to the stationary scenario of threshold data 120, low threshold-1 may be 7 centimeters (cm) and low threshold-2 may be 0.2 radians per second (rps). With respect to the moving scenario of threshold data 120, medium threshold-1 may be 10 cm, medium threshold-2 may be 0.3 rps, and medium threshold-3 may be 10 cm. With respect to the sudden deceleration scenario of threshold data 120, high threshold-1 may be 13 cm, high threshold-2 may be 0.4 rps, and high threshold-3 may be 13 cm. In other examples, each threshold value may be larger or smaller. In this example: low threshold-1 is less than medium threshold-1, and medium threshold-1 is less than high threshold-1; low threshold-2 is less than medium threshold-2, and medium threshold-2 is less than high threshold-2; and medium threshold-3 is less than high threshold-3. While in this example, the cliff sensors are not used in the stationary scenario, in other examples, the cliff sensors may be used for the stationary scenario. For example, threshold data 120 may indicate a threshold value of low threshold-3 for the cliff sensors in the stationary scenario.

The stationary scenario 108(1) may be associated with the AMD 104 being stationary and not moving. The moving scenario may be associated with the AMD 104 moving but not suddenly decelerating. The sudden deceleration scenario may be associated with the AMD 104 suddenly decelerating. Sudden deceleration may be associated with deceleration that causes one or more wheels of the AMD 104 to lift from a floor. For example, a deceleration threshold used to indicate sudden deceleration may be decelerating at a rate greater than 2.75 meters/(second*second) (m/s*s). In other examples, based on a center of mass, weight, wheel distribution, number of wheels, the deceleration threshold for determining a sudden deceleration scenario may be different. In the sudden deceleration scenario threshold values, high threshold-1 and high threshold-3, are based on the amount of distance the AMD 104 lifts from a floor. For example, high threshold-1, used for distances determined using accelerometer data, is at least greater than the distance the AMD 104 lifts from the floor. Similarly for high threshold-3, used for distances determined using cliff sensor data.

A cliff sensor may be a time-of-flight sensor. For example, a cliff sensor may be implemented by a Texas Instruments time-of-flight sensor model OPT3101. The AMD 104 may comprise multiple cliff sensors located on a front portion of the AMD 104. The cliff sensors may be positioned to have a field of view (FoV) that includes an area of a floor in front of the AMD 104.

In some implementations, the cliff sensors may be in a low-power state and not determining sensor data while the AMD 104 is stationary. In some implementations, the one or more sensors may be used by other systems of the AMD 104. For example, the cliff sensors may be used during navigation to detect objects or obstacles, such as toys, ramps, stairs, and so forth. A first cliff sensor may be directed downward toward a floor and leftward, a second cliff sensor may be directed downward toward the floor ahead of the AMD 104, and a third cliff sensor may be directed downward toward the floor and rightward.

The AMD 104 may be configured to dock or connect to a dock 160. The dock 160 may provide external power which the AMD 104 may use to charge a battery 144 of the AMD 104.

The AMD 104 may include battery(s) 144 to provide electrical power for operation of the AMD 104. The battery 144 may be rechargeable, allowing it to store electrical energy obtained from an external source. In other implementations, a wireless power receiver may be used to provide power for operation of the AMD 104, recharge the battery 144, and so forth.

One or more motors 142 or other actuators enable the AMD 104 to move from one location in the physical space 106 to another. For example, a motor 142 may be used to drive a wheel attached to a chassis of the AMD 104, which causes the AMD 104 to move. The AMD 104 may turn, move forward, move backward, and so forth. In another example, actuators may move mechanical legs allowing the AMD 104 to walk. In this example, in response to the lift detection module 154 determining a lift event, the AMD 104 may perform operations that include stopping the mechanical legs or retracting the mechanical legs into a stowed position.

The AMD 104 may include one or more hardware processors 140 (processors) configured to execute one or more stored instructions. The processors 140 may comprise one or more cores. The processors 140 may include microcontrollers, systems on a chip, field programmable gate arrays, digital signal processors, graphic processing units, general processing units, and so forth.

The AMD 104 includes one or more memories 146. The memory 146 may comprise one or more non-transitory computer-readable storage media (CRSM).

The AMD 104 may include one or more sensors 152. For example, the sensors 152 may include microphones, time-of-flight (TOF) sensors cameras, LIDAR, inductive sensors, and so forth. The sensors 152 may generate sensor data 148 and the inductive sensors may generate signal data indicative of measured signal strength. The sensors 152 are discussed in more detail with regard to FIG. 3.

An autonomous navigation module 158 provides the AMD 104 with the ability to navigate within the physical space 106 without real-time human interaction. The autonomous navigation module 158 may implement, or operate in conjunction with, the mapping module 220 to determine one or more of an occupancy map, a navigation map, or other representations of the physical space 106. The AMD 104 may move through the physical space 106. The motion of the AMD 104 may be described as a trajectory. In some implementations the trajectory may include a series of poses. Each pose may be indicative of a particular location with respect to a plurality of orthogonal axes and rotation with respect to individual ones of the axes. For example, the pose may comprise six-dimensional (6D) information indicative of coordinates in three-dimensional space with respect to a designated origin and rotation with respect to each of the three axes. The autonomous navigation module 158 is discussed in more detail with regard to FIG. 2.

The motor control module 132 may, in response to a lift event, turn off a motor or linear actuator to stop one or more wheels from rotating. The motor control module 132 may also, in response to a lift event, prevent one or more wheels from rotating. For example, instructions to the motors 142 may be indicated by motor control data 150 and executed by a motor controller.

The AMD 104 may use network interfaces 254 to connect to a network 162. For example, the network 162 may comprise a wireless local area network, that in turn is connected to a wide area network such as the Internet.

The dock 160 may also be connected to the network 162. For example, the dock 160 may be configured to connect to the wireless local area network 162 such that the dock 160 and the AMD 104 may communicate.

The AMD 104 may access one or more servers 164 via the network 162. For example, the AMD 104 may utilize a wakeword detection module to determine if the user 112 is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user 112 to one or more servers 164 for further processing. The servers 164 may process the spoken audio and return to the AMD 104 data that may be subsequently used to operate the AMD 104.

The AMD 104 may also communicate with other devices 166. The other devices 166 may include one or more devices that are within the physical space 106 such as a home or associated with operation of one or more devices in the physical space 106. For example, the other devices 166 may include a doorbell camera, a garage door opener, a refrigerator, washing machine, and so forth. In some implementations the other devices 166 may include other AMDs 104, vehicles, and so forth.

Figure 2:
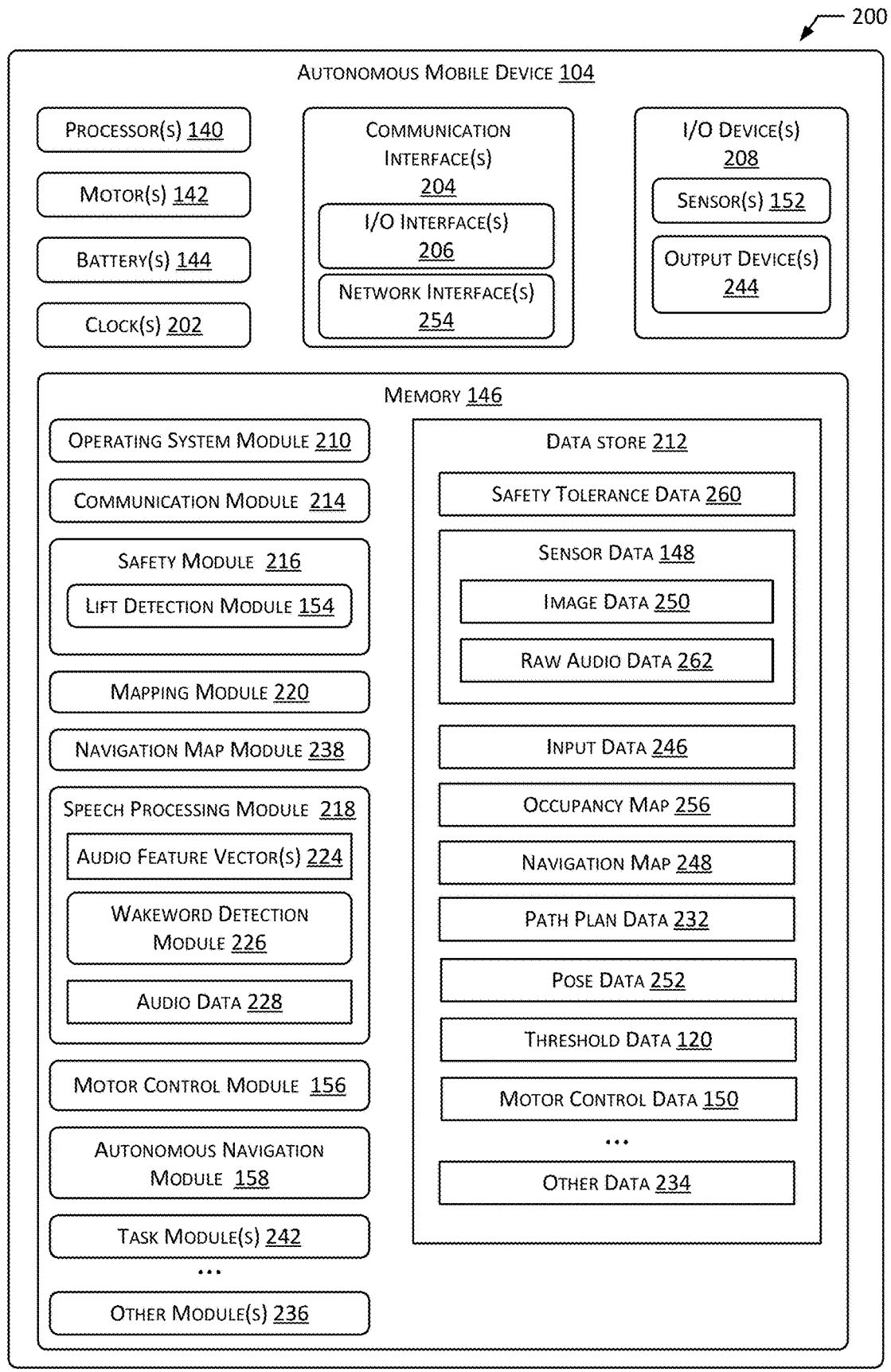
FIG. 2 is a block diagram of the components of the AMD, according to some implementations.

FIG. 2 is a block diagram 200 of the components of the AMD 104, according to some implementations.

The AMD 104 may include one or more batteries 144 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

The AMD 104 may include one or more network interfaces 254. The network interfaces 254 may include devices to connect to personal area networks (PANS), local area networks (LANs), wireless local area networks (WLANS), wide area networks (WANs), and so forth. For example, the network interfaces 254 may include devices compatible with Ethernet, Wi-Fi, Bluetooth, Bluetooth Low Energy, ZigBee, and so forth.

During operation, the AMD 104 may determine input data 246. The input data 246 may include or be based at least in part on sensor data 148 from the sensors 152 onboard the AMD 104. In one implementation, a speech processing module 218 may process raw audio data 262 obtained by a microphone on the AMD 104 and produce input data 246. For example, a user may say "robot, come here" which may produce input data 246 "come here". In another implementation, the input data 246 may comprise information such as a command provided by another computing device, such as a smartphone or tablet computer.

A mapping module 220 determines a representation of the physical space 106 that includes obstacles and their locations in the physical space 106. During operation, the mapping module 220 uses the sensor data 148 from various sensors 152 to determine information such as where the AMD 104 is, how far the AMD 104 has moved, the presence of obstacles, where those obstacles are, and so forth.

The mapping module 220 uses a simultaneous localization and mapping (SLAM) module. Localization is determining where the AMD 104 is in the physical space 106 and may utilize some external reference. For example, cameras may acquire images. These images are processed to determine the presence of features in the images, such as edges of doors, shadows on the wall, texture on the walls, and so forth.

A descriptor is information that describes a particular feature or set of features. Various techniques such as a scale-invariant feature transform (SIFT), speeded up robust features (SURF), a trained convolutional neural network, and so forth may be used to characterize the features and generate the descriptors. For example, the descriptor may comprise data indicative of the feature with respect to 256 different dimensions.

While the AMD 104 is moving, the SLAM module may provide as output a series of poses, each pose describing a location and rotations in the physical space 106. Each pose is based at least in part on the apparent motion of observed features in the images. For example, from image to image at least some of the features that are described by descriptors will be in common. By determining the relative difference in apparent position in the image of the same feature as observed by two different cameras at the same time, the location of the camera with respect to the feature in the physical space 106 may be determined. At successive times, and as the AMD 104 moves and additional images are acquired from locations in the physical space 106, the apparent change in position of the same feature across the additional images may be used to determine subsequent poses. In some implementations, an orientation may comprise information about six dimensions (6D), that of three orthogonal axes and corresponding rotations about those axes.

The SLAM module may also use data from other sensors 152 such as motor encoders, inertial measurement units (IMU) with one or more accelerometers and gyroscopes, and so forth. An IMU may comprise a tilt sensor. For example, inertial data indicative of rotations, accelerations along particular axes, and so forth obtained from the IMU may be integrated to provide information about the movement of the AMD 104.

A set of poses generated by the SLAM module over time may describe a given AMD 104 trajectory. For example, trajectory data may comprise a time series of pose data 252 from the SLAM module.

While the AMD 104 is operating, the sensors 152 may be used to acquire sensor data 148 comprising information about the physical space 106. In addition to cameras, the AMD 104 may include depth sensors that may determine depth data about the presence or absence of obstacles in the physical space 106, and so forth. For example, the sensors 152 may comprise a time-of-flight (TOF) depth camera, ultrasound, radar, and so forth. The depth data is indicative of whether an obstacle is detected or not and includes information about the distance between the sensor 152 and the obstacle and relative direction with respect to the sensor 152 and an obstacle, if detected.

The sensor data 148 may be processed to determine occupancy data. The occupancy data is indicative of a particular area in the physical space 106, relative to the pose of the AMD 104 at the time the sensor data 148 was acquired, and whether that area contains an obstacle or is determined to be free from obstacles.

The occupancy map 256 may be manually or automatically determined as part of an exploration process. This exploration may include an explicit exploration in which the AMD 104 moves through the physical space 106 or may be incidental exploration to movement of the AMD 104. For example, explicit exploration may involve the AMD 104 starting with no occupancy map 256 and moving throughout the physical space 106 to determine occupancy data and the corresponding occupancy map 256. In another example, incidental exploration may involve the AMD 104 following the user 112. Continuing the example, during a learning phase the user 112 may take the AMD 104 on a tour of the physical space 106, allowing the mapping module 220 of the AMD 104 to determine occupancy data and the corresponding occupancy map 256. The user may provide input data 246 such as tags or other semantic data that designates a particular obstacle type, such as "furniture" or "fragile". In another example, during subsequent operation, the AMD 104 may generate the occupancy map 256 that is indicative of locations and types of obstacles such as chairs, doors, stairwells, and so forth as it moves unattended through the physical space 106.

Modules described herein, such as the mapping module 220, may provide various processing functions such as de-noising, filtering, and so forth. Processing of sensor data 148, such as image data 250 from a camera, may be performed by a module implementing, at least in part, one or more of the following tools or techniques. In one implementation, processing of image data 250 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia. In another implementation, functions available in the OKAO machine vision library as promulgated by Omron Corporation of Kyoto, Japan, may be used to process the sensor data 148. In still another implementation, functions such as those in the Machine Vision Toolbox (MVTB) available using MATLAB as developed by MathWorks, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 148 or other data. For example, the ANN may be trained using a supervised learning algorithm such that object identifiers are associated with images of particular objects within training images provided to the ANN. Once trained, the ANN may be provided with the sensor data 148 and produce output indicative of the object identifier.

A navigation map module 238 uses the occupancy map 256 as input to generate a navigation map 248. For example, the navigation map module 238 may produce the navigation map 248 by inflating or enlarging the apparent size of obstacles as indicated by the occupancy map 256.

The AMD 104 autonomous navigation module 158 may generate path plan data 232 that is indicative of a path through the physical space 106 from the current location to a destination location. The AMD 104 may then begin moving along the path.

While moving along the path, the AMD 104 may assess the physical space 106 and update or change the path as appropriate. For example, if an obstacle appears in the path, the mapping module 220 may determine the presence of the obstacle as represented in the occupancy map 256 and navigation map 248. The now updated navigation map 248 may then be used to plan an alternative path to the destination location.

The AMD 104 may utilize one or more task modules 242. The task module 242 comprises instructions that, when executed, provide one or more functions. The task modules 242 may perform functions such as finding a user 112, following a user 112, presenting output on output devices 244 of the AMD 104, performing sentry tasks by moving the AMD 104 through the physical space 106 to determine the presence of unauthorized people, and so forth.

The AMD 104 includes one or more output devices 244, such as one or more of a motor 142, light, speaker, display, projector, printer, and so forth. The one or more output devices 244 may be used to provide output during operation of the AMD 104. The output devices 244 are discussed in more detail with regard to FIG. 3.

In other implementations, other types of autonomous mobile devices (AMDs) may use the systems and techniques described herein. For example, the AMD 104 may comprise an autonomous ground vehicle that is moving on a street, an autonomous aerial vehicle in the air, autonomous marine vehicle, and so forth.

One or more clocks 202 may provide information indicative of date, time, ticks, and so forth. For example, the processor 140 may use data from the clock 202 to associate a particular time with an action, sensor data 148, and so forth.

The AMD 104 may include one or more hardware processors 140 (processors) configured to execute one or more stored instructions. The processors 140 may comprise one or more cores. The processors 140 may include microcontrollers, systems on a chip, field programmable gate arrays, digital signal processors, graphic processing units, general processing units, and so forth.

The AMD 104 may include one or more communication interfaces 204 such as input/output (I/O) interfaces 206, network interfaces 254, and so forth. The communication interfaces 204 enable the AMD 104, or components thereof, to communicate with other devices 166 or components. The communication interfaces 204 may include one or more I/O interfaces 208. The I/O interfaces 208 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 152, keyboard, mouse, scanner, and so forth. The I/O devices 208 may also include output devices 244 such as one or more of a motor 142, light, speaker, display, projector, printer, and so forth. In some embodiments, the I/O devices 208 may be physically incorporated with the AMD 104 or may be externally placed.

The network interfaces 254 may be configured to provide communications between the AMD 104 and other devices 166 such as other AMDs 104, the dock 160, routers, access points, and so forth. The network interfaces 254 may include devices configured to couple to personal area networks (PANS), local area networks (LANs), wireless local area networks (WLANS), wide area networks (WANs), and so forth. For example, the network interfaces 254 may include devices compatible with Ethernet, Wi-Fi, Bluetooth, Bluetooth Low Energy, ZigBee, and so forth. The AMD 104 may also include one or more buses or other internal communications hardware or software that allow for the transfer of data between the various modules and components of the AMD 104.

As shown in FIG. 2, the AMD 104 includes one or more memories 146. The memory 146 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 146 provides storage of computer-readable instructions, data structures, program modules, and other data for the operation of the AMD 104. A few example functional modules are shown stored in the memory 146, although the same functionality may alternatively be implemented in hardware, firmware, or as a system on a chip (SoC).

The memory 146 may include at least one operating system (OS) module 210. The OS module 210 is configured to manage hardware resource devices such as the I/O interfaces 206, the I/O devices 208, the communication interfaces 204, and provide various services to applications or modules executing on the processors 140. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS), and so forth.

Also stored in the memory 146 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 166 including other AMDs 104, servers 164, network attached storage devices, and so forth.

A communication module 214 may be configured to establish communication with other devices 166, such as other AMDs 104, an external server 164, a dock 160, and so forth. The communications may be authenticated, encrypted, and so forth.

Other modules within the memory 146 may include a safety module 216, the mapping module 220, the navigation map module 238, the autonomous navigation module 158, the one or more task modules 242, a speech processing module 218, or other modules 236. The modules may access data stored within the data store 212, including safety tolerance data 260, sensor data 148, other data 234, and so forth.

The safety module 216 may access the safety tolerance data 260 to determine within what tolerances the AMD 104 may operate safely within the physical space 106. For example, the safety module 216 may be configured to stop the AMD 104 from moving when an extensible mast of the AMD 104 is extended. In another example, the safety tolerance data 260 may specify a minimum sound threshold which, when exceeded, stops all movement of the AMD 104. Continuing this example, detection of sound such as a human yell would stop the AMD 104.

The safety module 216 may include a speed limit module. The safety tolerance data 260 may include one or more of the thresholds used by the speed limit module. In the event the speed limit module determines a stop state, movement of the AMD 104 may be stopped by one or more of inhibiting operations of one or more of the motors 142, issuing a command to stop motor operation, disconnecting power from one or more the motors 142, and so forth. The safety module 216 may be implemented as hardware, software, or a combination thereof.

The safety module 216 may control other factors, such as a maximum speed of the AMD 104 based on information obtained by the sensors 152, precision and accuracy of the sensor data 148, and so forth. For example, detection of an object by an optical sensor may include some error, such as when the distance to an object comprises a weighted average between the object and a background. As a result, the maximum speed permitted by the safety module 216 may be based on one or more factors such as the weight of the AMD 104, nature of the floor, distance to the object, and so forth. In the event that the maximum permissible speed differs from the maximum speed permitted by the safety module 216, the lesser speed may be utilized.

One or more inflation parameters may be used during operation. The inflation parameters provide information such as inflation distance, inflation adjustment values, and so forth. In some implementations the inflation parameters may be based at least in part on the sensor FOV, sensor blind spot, physical dimensions of the AMD 104, and so forth.

The speech processing module 218 may be used to process utterances of the user 112. Microphones may acquire audio in the presence of the AMD 104 and may send raw audio data 262 to an acoustic front end (AFE). The AFE may transform the raw audio data 262 (for example, a single-channel, 16-bit audio stream sampled at 16 kHz), acquired by the microphone, into audio feature vectors 224 that may ultimately be used for processing by various components, such as a wakeword detection module 226, speech recognition engine, or other components. The AFE may reduce noise in the raw audio data 262. The AFE may also perform acoustic echo cancellation (AEC) or other operations to account for output audio data that may be sent to a speaker of the AMD 104 for output. For example, the AMD 104 may be playing music or other audio that is being received from a network 162 in the form of output audio data. To avoid the output audio interfering with the device's ability to detect and process input audio, the AFE or other component may perform echo cancellation to remove the output audio data from the input raw audio data 262, or other operations.

The AFE may divide the raw audio data 262 into frames representing time intervals for which the AFE determines a number of values (i.e., features) representing qualities of the raw audio data 262, along with a set of those values (i.e., a feature vector or audio feature vector 224) representing features/qualities of the raw audio data 262 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 262, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 262) may be input into a wakeword detection module 226 that is configured to detect keywords spoken in the audio. The wakeword detection module 226 may use various techniques to determine whether raw audio data 262 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 262 or the audio feature vectors 224) to one or more server(s) 164 for speech processing. The audio data 228 corresponding to audio obtained by the microphone may be processed locally on one or more of the processors 140, sent to a server 164 for routing to a recipient device or may be sent to the server 164 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before processing by the navigation map module 238, prior to sending to the server 164, and so forth.

The speech processing module 218 may include or access an automated speech recognition (ASR) module. The ASR module may accept as input raw audio data 262, audio feature vectors 224, or other sensor data 148 and so forth and may produce as output the input data 246 comprising a text string or other data representation. The input data 246 comprising the text string or other data representation may be processed by the navigation map module 238 to determine the command to be executed. For example, the utterance of the command "robot, come here" may result in input data 246 comprising the text string "come here". The wakeword "robot" may be omitted from the input data 246.

The autonomous navigation module 158 provides the AMD 104 with the ability to navigate within the physical space 106 without real-time human interaction. The autonomous navigation module 158 may implement, or operate in conjunction with, the mapping module 220 to determine the occupancy map 256, the navigation map 248, or other representation of the physical space 106. In one implementation, the mapping module 220 may use one or more simultaneous localization and mapping ("SLAM") techniques. The SLAM algorithms may utilize one or more of maps, algorithms, beacons, or other techniques to navigate. The autonomous navigation module 158 may use the navigation map 248 to determine a set of possible paths along which the AMD 104 may move. One of these may be selected and used to determine path plan data 232 indicative of a path. For example, a possible path that is the shortest or has the fewest turns may be selected and used to determine the path. The path is then subsequently used to determine a set of commands that drive the motors 142 connected to the wheels. For example, the autonomous navigation module 158 may determine the current location within the physical space 106 and determine path plan data 232 that describes the path to a destination location.

The AMD 104 may use the autonomous navigation module 158 to navigate to a docking area that includes the dock 160. For example, if the AMD 104 determines to recharge one or more batteries 144, then the AMD 104 may use path plan data 232 to navigate to a destination location that is in front of the dock 160. The destination location is far enough in front of the dock 160 that the AMD 104 is able to turn around. After the AMD 104 turns around in front of the dock 160, the AMD 104 may begin to move backward to dock using inductive sensors to align the AMD 104 with the dock 160. For example, instructions to the motors 142 may be indicated by motor control data 150 and executed by the motor controller. In this example, the AMD 104 may comprise at least a first wheel on a first side and a second wheel on a second side. The motor control data 150 may indicate a rotational velocity of the first wheel as $V_1$ and a rotational velocity of the second wheel as $V_2$, where $V_1$ is greater than $V_2$, and where the difference between $V_1$ and $V_2$ results in the AMD 104 turning in a first direction. Similarly, to turn in an opposite direction from the first direction, the motor control data 150 may indicate a rotational velocity of the first wheel as $V_1$ and a rotational velocity of the second wheel as $V_2$, where $V_2$ is greater than $V_1$. To move straight backward, the motor control data 150 may indicate a rotational velocity of the first wheel as $V_1$ and a rotational velocity of the second wheel as $V_2$, where $V_1$ is equal to $V_2$.

The autonomous navigation module 158 may utilize various techniques during processing of sensor data 148. For example, image data 250 obtained from cameras on the AMD 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 140, in response to a command received from one or more communication interfaces 204, as determined from the sensor data 148, and so forth. For example, an external server 164 may send a command that is received using the network interface 254. This command may direct the AMD 104 to proceed to find a particular user, follow a particular user 112, and so forth. The AMD 104 may then process this command and use the autonomous navigation module 158 to determine the directions and distances associated with carrying out the command. For example, the command to "come here" may result in the task module 242 sending a command to the autonomous navigation module 158 to move the AMD 104 to a particular location near the user and orient the AMD 104 in a particular direction.

The AMD 104 may connect to the network 162 using one or more of the network interfaces 254. In some implementations, one or more of the modules or other functions described here may execute on the processors 140 of the AMD 104, on the server 164, or a combination thereof. For example, one or more servers 164 may provide various functions, such as ASR, natural language understanding (NLU), providing content such as audio or video to the AMD 104, and so forth.

The other modules 236 may provide other functionality, such as object recognition, speech synthesis, user identification, and so forth. The other modules 236 may comprise a speech synthesis module that is able to convert text data to human speech. For example, the speech synthesis module may be used by the AMD 104 to provide speech that a user is able to understand.

The data store 212 may store the other data 234 as well. For example, localization settings may indicate local preferences such as language, user identifier data may be stored that allows for identification of a particular user, and so forth. The data store 212 may also store values for threshold data 120.

Figure 3:
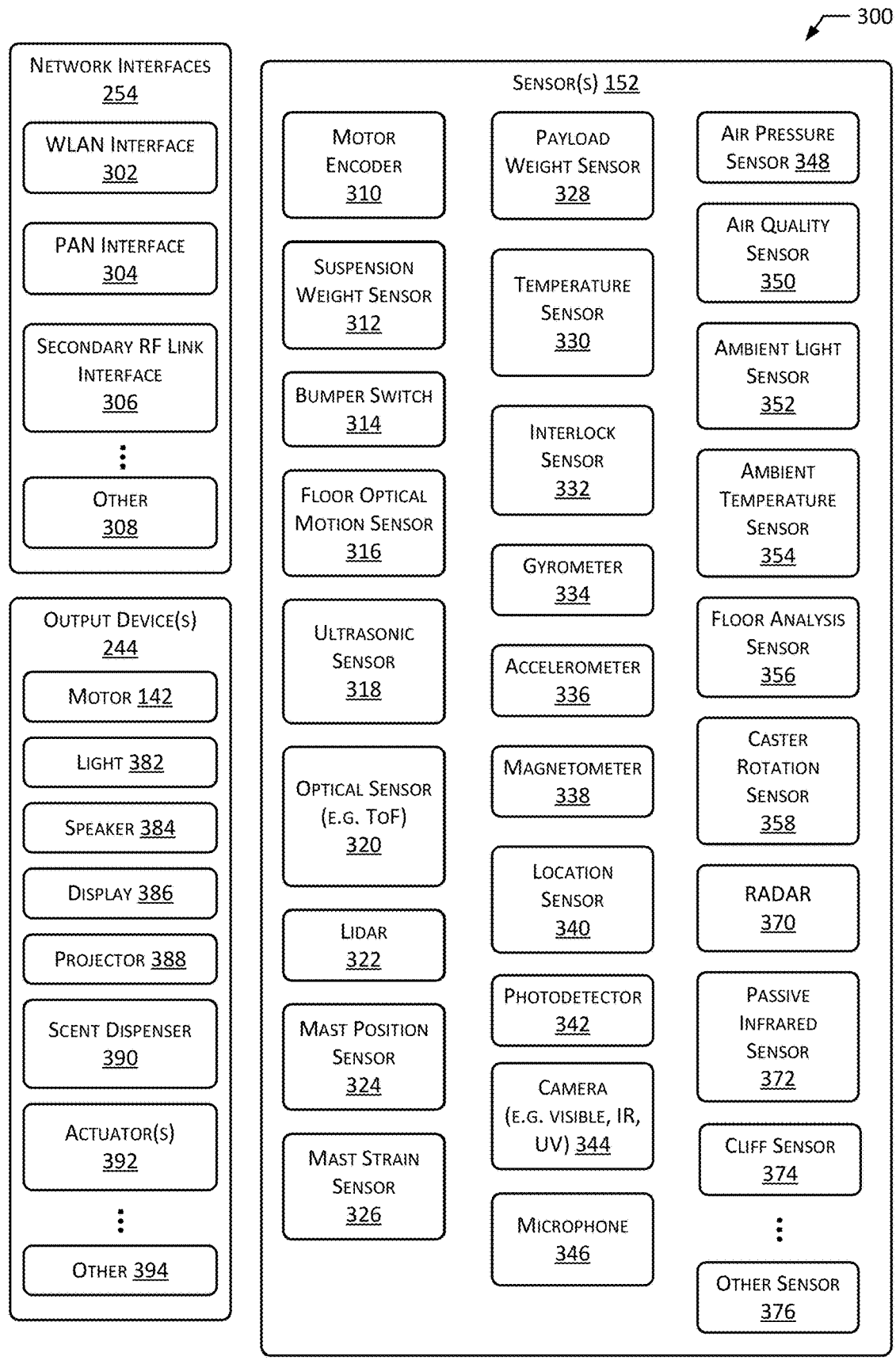
FIG. 3 is a block diagram of additional components of the AMD, according to some implementations.

FIG. 3 is a block diagram 300 of additional components of the AMD 104, according to some implementations.

The components illustrated here are provided by way of illustration and not necessarily as a limitation. For example, the AMD 104 may utilize a subset of the particular network interfaces 254, output devices 244, or sensors 152 depicted here, or may utilize components not pictured. One or more of the sensors 152, output devices 244, or a combination thereof may be included on a moveable component that may be panned, tilted, rotated, or any combination thereof with respect to a chassis of the AMD 104.

The network interfaces 254 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 166 in the event that communication fails using one or more of the WLAN interface 302 or the PAN interface 304. For example, in the event the AMD 104 travels to an area within the physical space 106 that does not have Wi-Fi coverage, the AMD 104 may use the secondary RF link interface 306 to communicate with another device such as a specialized access point, dock 160, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 4G, LTE, 5G, or other standards.

The AMD 104 may include one or more of the following sensors 152. The sensors 152 depicted here are provided by way of illustration and not necessarily as a limitation. It is understood that other sensors 152 may be included or utilized by the AMD 104, while some sensors 152 may be omitted in some configurations.

A motor encoder 310 provides information indicative of the rotation or linear extension of a motor 142. The motor 142 may comprise a rotary motor, or a linear actuator. In some implementations, the motor encoder 310 may comprise a separate assembly such as a photodiode and encoder wheel that is affixed to the motor 142. In other implementations, the motor encoder 310 may comprise circuitry configured to drive the motor 142. For example, the autonomous navigation module 158 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector 342, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors 142. For example, if the suspension weight sensor 312 indicates no weight on the suspension, the implication is that the AMD 104 is no longer resting on its wheels, and thus operation of the motors 142 may be inhibited. In another example, if the suspension weight sensor 312 indicates weight that exceeds a threshold value, the implication is that something heavy is resting on the AMD 104 and thus operation of the motors 142 may be inhibited. For example, the threshold value may comprise a weight of a load that compresses a suspension system to a minimum height, or results in a mass that exceeds a torque output of the motors 142 to maintain a minimum acceleration.

One or more bumper switches 314 provide an indication of physical contact between a bumper or other member that is in mechanical contact with the bumper switch 314. The safety module 216 utilizes sensor data 148 obtained by the bumper switches 314 to modify the operation of the AMD 104. For example, if the bumper switch 314 associated with a front of the AMD 104 is triggered, the safety module 216 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 152 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 148 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 152 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 158 may utilize the sensor data 148 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 148 may be generated that is indicative of the presence of objects and the relative positions, shapes, and so forth that are visible to the lidar 322. Data from the lidar 322 may be used by various modules. For example, the autonomous navigation module 158 may utilize point cloud data generated by the lidar 322 for localization of the AMD 104 within the physical space 106.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector 342 to determine the distance to which the mast is extended. In another implementation, the mast position sensor 324 may comprise an encoder wheel that is attached to a mast motor that is used to raise or lower the mast. The mast position sensor 324 may provide data to the safety module 216. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a sideload applied to the mast or a weight on the mast or downward pressure on the mast. The safety module 216 may utilize sensor data 148 obtained by the mast strain sensor 326. For example, if the strain applied to the mast exceeds a threshold amount, the safety module 216 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 144, one or more motors 142, and so forth. In the event the temperature exceeds a threshold value, the component associated with that device temperature sensor 330 may be shut down. For example, the threshold value may be determined based on component specifications, such as a maximum permissible temperature of the batteries 144.

One or more interlock sensors 332 may provide data to the safety module 216 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, a gyroscope 334 may generate sensor data 148 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 148 indicative of impinging light. For example, the photodetector 342 may provide data indicative of a color, intensity, duration, and so forth.

A camera 344 generates sensor data 148 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data 250 acquired by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 148 comprising images being sent to the autonomous navigation module 158. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 158 may be acquired using a rolling shutter and subsequently may be processed to mitigate image artifacts.

One or more microphones 346 may be configured to acquire information indicative of sound present in the physical space 106. In some implementations, arrays of microphones 346 may be used. These arrays may implement beamforming techniques to provide for directionality of gain. The AMD 104 may use the one or more microphones 346 to acquire information from acoustic tags, accept voice input from users 112, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space 106 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 158, the task module 242, and so forth. For example, if the floor analysis sensor 356 determines that the floor is wet, the safety module 216 may decrease the speed of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 152 may include a radar 370. The radar 370 may be used to provide information as to a distance, lateral position, and so forth, to an object.

A cliff sensor 374 may comprise an optical sensor 320. The AMD 104 may have one or more cliff sensors 374 located on a front portion of the AMD 104. For example, the cliff sensors 374 may be time-of-flight sensors that have a field of view directed downward toward a floor over which the AMD 104 is moving towards.

The sensors 152 may include a passive infrared (PIR) sensor 372. The PIR 372 sensor may be used to detect the presence of users 112, pets, hotspots, and so forth. For example, the PIR sensor 372 may be configured to detect infrared radiation with wavelengths between 8 and 14 micrometers.

The AMD 104 may include other sensors 376 as well. For example, a capacitive proximity sensor may be used to provide proximity data to adjacent objects. Other sensors 376 may include radio frequency identification (RFID) readers, near field communication (NFC) systems, coded aperture cameras, and so forth. For example, NFC tags may be placed at various points within the physical space 106 to provide landmarks for the autonomous navigation module 158. One or more touch sensors may be utilized to determine contact with a user or other objects.

The AMD 104 may include one or more output devices 244. A motor 142 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user 112. Continuing the example, a motor 142 with an eccentric weight may be used to create a buzz or vibration to allow the AMD 104 to simulate the purr of a cat.

Figure 4:
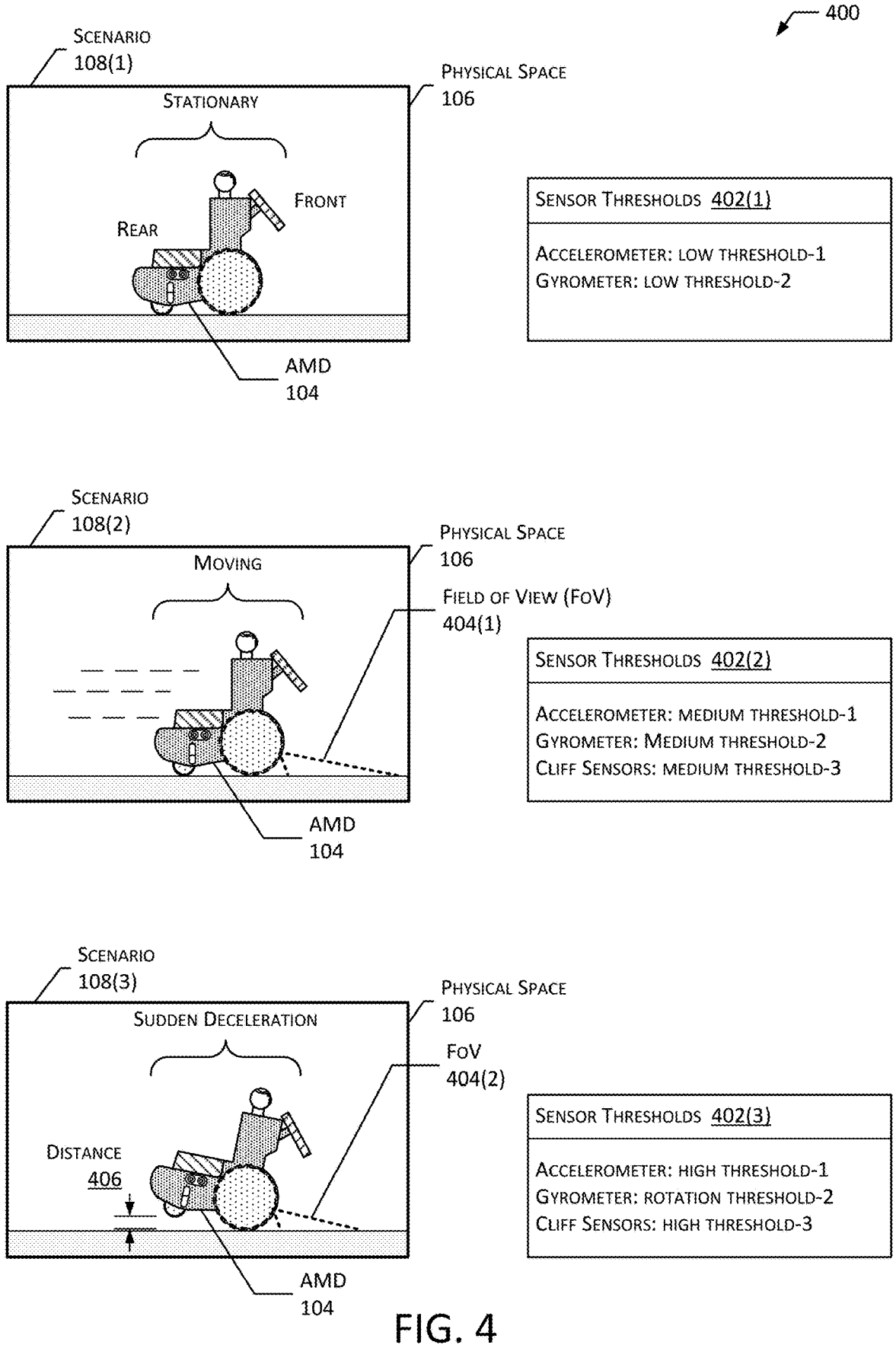
FIG. 4 illustrates several scenarios for an AMD 104, according to some implementations.

FIG. 4 illustrates, at 400, several scenarios for an AMD 104, according to some implementations.

As described above with respect to FIG. 1, the AMD 104 may be determined to be in several different scenarios. For example, as depicted in FIG. 1, the AMD 104 is in a stationary scenario 108(1). Sensor thresholds 402(1) are associated with the stationary scenario and are described with respect to threshold data 120. In this example, scenario 108(2) depicts a moving scenario. Sensor thresholds 402(2) are associated with the moving scenario and are described with respect to threshold data 120. In the moving scenario 108(2), the AMD 104 is moving but not decelerating beyond the deceleration threshold. In this example, scenario 108(3) depicts a sudden deceleration scenario. Sensor thresholds 402(3) are associated with the deceleration scenario and are described with respect to threshold data 120. In the sudden deceleration scenario 108(3), the AMD 104 is decelerating at a rate that is greater than the deceleration threshold. In the sudden deceleration scenario 108(3), a rear portion of the AMD 104 has lifted a first distance from the floor, distance 406.

In this example, in the moving scenario 108(2) and the sudden deceleration scenario 108(3), the cliff sensors 374 are determining cliff sensor data. Field of view (FoV) 404(1) is associated with the AMD 104 moving. Field of view 404(2) is associated with the AMD 104 suddenly decelerating and a rear portion of the AMD 104 being a distance 406 from the floor because the AMD 104 is tilted forward. Field of view 404(2) is smaller because the cliff sensors 374 are directed more downward than when then AMD 104 is not tilted forward.

Figure 5:
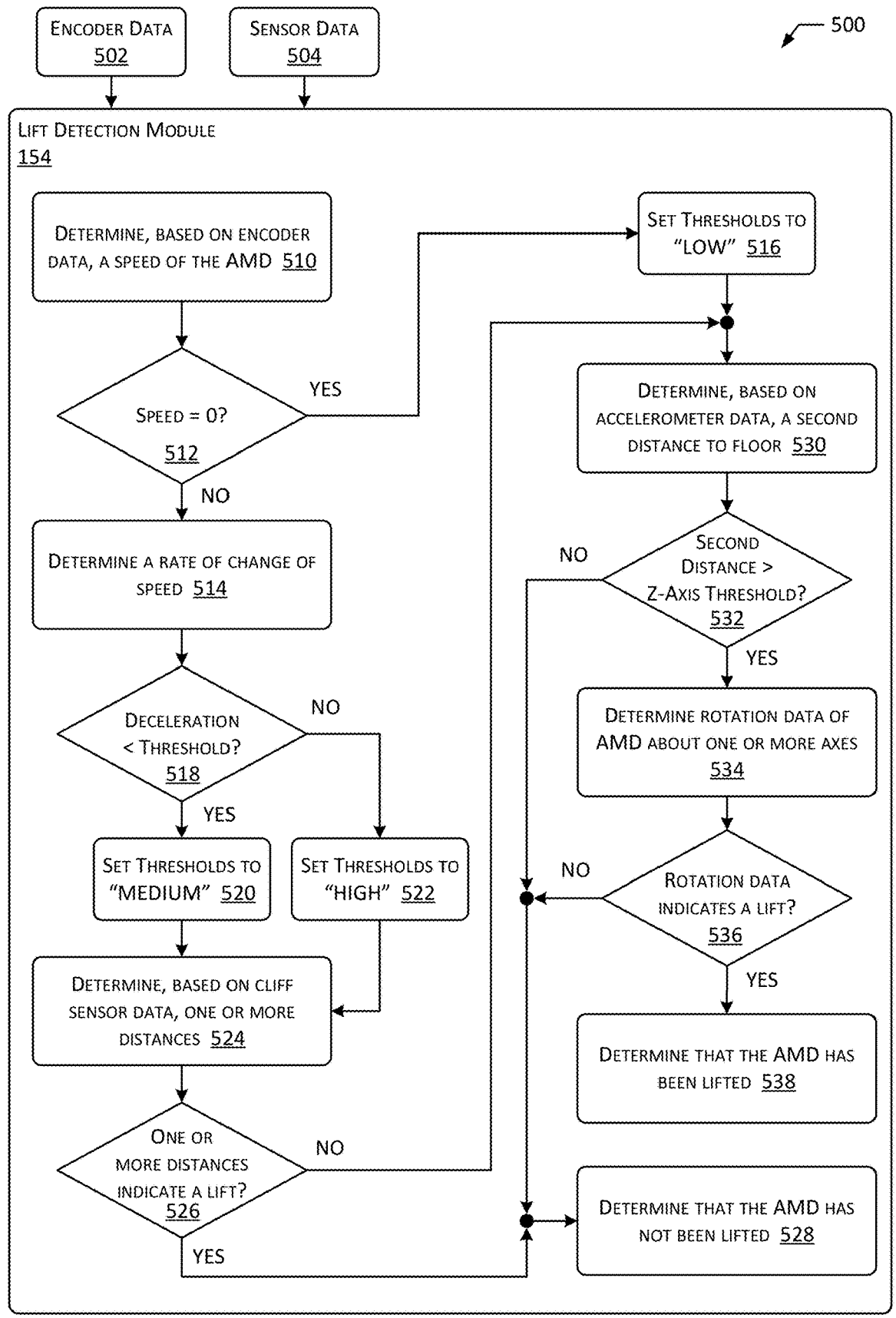
FIG. 5 illustrates a flow diagram for a lift detection module, according to some implementations.

FIG. 5 illustrates a flow diagram 500 for a lift detection module 154, according to some implementations.

In this example, the lift detection module 154 uses encoder data 502 and sensor data 504 to determine a lift event. A motor encoder 310 may be used to determine encoder data 502. Encoder data 502 may indicate a speed at which one or more wheels are rotating. The AMD 104 speed may be determined using the speed at which the one or more wheels are rotating and the diameter of the one or more wheels. Sensor data 504 may comprise sensor data 148 determined by one or more sensors 152, including one or more of: an accelerometer 336, a gyrometer 334, and a cliff sensor 374. Accelerometer data may indicate one or more acceleration values over a time interval, and the one or more acceleration values may be used to determine a speed of the AMD 104.

At 510, the lift detection module 154 determines, based on the encoder data 502, a speed of the AMD 104. The encoder data 502 may indicate the speed at which one or more wheels of the AMD 104 are rotating. For example, the encoder data 502 may indicate rotation speed or linear extension of the motor 142. The speed of the AMD 104 may be based on a radius of the wheel or wheels being driven by the motor 142 and the rotation speed of the one or more wheels. After determining the speed of the AMD 104, the process continues to 512.

At 512, the lift detection module 154 determines whether the speed of the AMD 104 is equal to zero. If the speed of the AMD 104 is equal to zero, then the AMD 104 is stationary, and the process continues to 516. If the speed of the AMD 104 is not equal to zero, then the AMD 104 is moving, and the process continues to 514. If the speed of the AMD 104 is not equal to zero, then the AMD 104 may be moving forward or moving backward. Moving may include accelerating, moving at a constant speed, or decelerating.

At 516, the lift detection module 154 sets thresholds to "LOW". As described with respect to FIG. 1, in different scenarios, the lift detection module 154 uses different threshold values for determining whether sensor data 504 is indicative of a lift event. In this example, based on the speed of the AMD 104 not being greater than zero, the AMD 104 is determined to be stationary, and low threshold values are used in subsequent uses of the sensor data 504. Example threshold values associated with different scenarios are depicted by threshold data 120 in FIG. 1. In the stationary scenario, the thresholds are set to "LOW" before the thresholds are used in the determinations at 532 and 536. After setting thresholds to "LOW", the process continues to 530.

At 514, the lift detection module 154 determines a rate of change of speed. In a first implementation the encoder data 502 may be used to determine the rate of change of speed. In this implementation, the encoder data 502 may indicate a speed at which one or more wheels are rotating. The AMD 104 speed may be determined using the speed at which the wheels are rotating and the diameter of the wheels. The encoder data 502 may be indicative of these speeds over a time interval and may be used to determine a rate of change of speed.

In a second implementation, accelerometer data may be used to determine a rate of change of speed. For example, the accelerometer 336 may provide accelerometer data and store this as sensor data 504. The accelerometer data may be used to determine the rate of change of speed. In this example, the lift detection module 154 may determine a running mean of a previous X measurements of rates of change of speed. X may be based on a buffer size and on a measurement rate of the accelerometer 336. For example, a buffer may hold 100 measurements. Acceleration is indicated by a positive rate of change of speed, and deceleration is indicated by a negative rate of change of speed. After determining the rate of change of speed, the process continues to 518.

At 518, the lift detection module 154 determines whether the deceleration of the AMD 104 is below a threshold. If the AMD 104 is decelerating and the deceleration is greater than the threshold, then the process continues to 522. If the AMD 104 is not decelerating or the AMD 104 is decelerating at a rate that is less than or equal to the threshold, then the process continues to 520. As described with respect to FIG. 1, if the deceleration is sudden enough, then the scenario for the AMD 104 is determined to be suddenly decelerating. During sudden deceleration, the momentum of the AMD 104 raises a rear portion of the AMD 104 from the floor by a raise distance. In the sudden deceleration scenario, the thresholds for sensor data are set to "HIGH" to account for the raise distance and to account for an increased magnitude of other sensor data 504 due to the sudden deceleration. In this example, sudden deceleration may be associated with a threshold of 2.75 m/(s*s).

At 520, the lift detection module 154 sets the thresholds to "MEDIUM". As described with respect to FIG. 1, in this scenario, the AMD 104 is moving, but is not suddenly decelerating. In the moving scenario, the thresholds are set to "MEDIUM" before the thresholds are used in the determinations at 526, 532, and 536. After setting the thresholds, the process continues to 524.

At 522, the lift detection module 154 sets thresholds to "HIGH". As described with respect to FIG. 1, in this scenario, the AMD 104 is suddenly decelerating. In the sudden deceleration scenario, the thresholds are set to "HIGH" before the thresholds are used in the determinations at 526, 532, and 536. After setting the thresholds, the process continues to 524.

At 524, the lift detection module 154 determines, based on cliff sensor data, one or more distances. For example, the AMD 104 may have one or more cliff sensors 374 located on a front portion of the AMD 104. The one or more cliff sensors 374 may have fields of view that, when the AMD 104 is on a floor, include a portion of the floor in front of the AMD 104. If the AMD 104 has been lifted, then the one or more cliff sensors 374 may each indicate different distances to a same or different surface. For example, if the AMD 104 is being lifted, one or more cliff sensors 374 may determine sensor data 504 indicating a distance to a floor and one or more cliff sensors 374 may determine sensor data 504 indicating a distance to a wall or other obstacle. The cliff sensors 374 may determine distance measurements from a bottom portion of the AMD 104 to one or more surfaces, such as to a floor, obstacle, wall, or both a floor and wall if the AMD 104 is at an orientation where the fields of view of the cliff sensors 374 include multiple surfaces. For example, the bottom portion may be a portion of the chassis of the AMD 104. The sensor data 504 may indicate the distance measurements. Similar to the accelerometer data, the cliff sensor data may be stored within memory 146. For each of the cliff sensors, 374, the lift detection module 154 may determine a running mean of a previous Y distance measurements and use the running mean to determine the first distance. After determining the one or more distances, the process continues to 526.

At 526, the lift detection module 154 determines whether the one or more distances indicate a lift. In this example, if at least one cliff sensor 374 determines sensor data 504 indicating a first distance that is greater than a floor threshold, then the lift detection module 154 may determine a lift event indicating that the AMD 104 has been lifted. The floor threshold may be a value that is associated with a distance that is greater than a distance to a surface supporting the AMD 104. For example, the surface may be a floor. The floor may be a level floor or a floor that includes a down ramp. In this example, if a distance to the floor is Q centimeters, then the floor threshold may be a distance greater than (M×Q), where M is 1 or greater. M may be determined experimentally and may be larger or greater than 1. In this example, if all of the cliff sensors or if a threshold quantity of cliff sensors determine sensor data 504 indicating a second distance that is less than a wall threshold, then the lift detection module 154 may determine a lift event indicating that the AMD 104 has been lifted. In this example, if the AMD 104 is being lifted and is near a wall, then one or more of the sensor data 504 may indicate a small distance to the wall as the AMD 104 is being lifted. The wall threshold may be a threshold associated with a distance that is closer than a surface would be expected to be, such as a distance that is closer than an object or obstacle on the floor in front of the AMD 104 is expected to be. In this example, the wall threshold may be a distance less than (Q/N), where N is 2 or greater. N may be determined experimentally and may be larger or greater than 2. The threshold quantity of sensors may be a majority of the cliff sensors 374. The threshold quantity of sensors may be larger or smaller. If 526 is reached through 520, then the floor threshold used is a medium threshold-3. If 526 is reached through 522, then the floor threshold used is a high threshold-3. If the one or more distances indicate that the AMD 104 has been lifted, then the process continues to use accelerometer data and gyrometer data to increase the confidence that the AMD 104 has been lifted. In this example, if the one or more distances indicate that the AMD 104 has been lifted, then the process continues to 530. If the one or more distances do not indicate that the AMD 104 has been lifted, then no additional confirmation is done, and the process continues to 528.

At 528, the lift detection module 154 determines that the AMD 104 has not been lifted. In this example, the lift detection module 154 may repeat the process of determining a lift event after a period of time or after some threshold number of additional sensor measurements have been determined.

At 530, the lift detection module 154 determines, based on the accelerometer data, a second distance to the floor. For example, accelerometer data may indicate upward acceleration over a first time period, a first velocity over the first time period may be determined. Based on the first velocity over the first time period, a first distance moved by the AMD 104 upward along the Z-axis may be determined. After determining the second distance to the floor, the process continues to 532.

At 532, the lift detection module 154 determines whether the second distance is greater than a Z-axis threshold. If 532 is reached through 516, then the Z-axis threshold used is a low threshold-1. If 532 is reached through 520, then the Z-axis threshold used is a medium threshold-1. If 532 is reached through 522, then the Z-axis threshold used is a high threshold-1. If the second distance is greater than the Z-axis threshold, then the AMD 104 is not at a distance from the floor associated with a lift event and the process continues to 528. If the second distance is less than or equal to the Z-axis threshold, then the AMD 104 may possibly be at a distance from the floor associated with a lift event and the process continues to 534.

At 534, the lift detection module 154 determines rotation data of the AMD 104 about one or more axes. Rotation data may comprise encoder data 502 from a motor encoder, gyrometer data, accelerometer data, encoder data 502 and gyrometer data, or encoder data and accelerometer data. Encoder data 502 may indicate a speed at which one or more wheels are rotating. The AMD 104 may determine, based on gyrometer data, rotation of the AMD 104 about one or more axes. For example, sensor data 504 may include gyrometer data indicating, for one or more axes, one or more rates of rotation in radians over a second time period. Rotation of the AMD 104 may be determined using the rate of rotation over the second time period. A first rate of rotation may be indicative of rotation of the AMD 104 about the X-axis, a second rate of rotation may be indicative of rotation of the AMD 104 about the Y-axis, and a third rate of rotation may be indicative of rotation of the AMD 104 about the Z-axis.

The lift detection module 154 may also determine a fourth rate of rotation based on the motor encoder data 502. For example, as discussed above, the AMD 104 may have a first main wheel and a second main wheel. If the first main wheel is rotating at a speed that is different than the second main wheel, then the AMD 104 may have an angular velocity that may be determined from the difference in speeds of rotation. If the AMD 104 is rotating on a floor, then a difference between the third rate of rotation and the fourth rate of rotation may be less than or equal to a variance threshold. However, if the AMD 104 has been lifted while rotating, then there may be a difference between the third rate of rotation and the fourth rate of rotation based on the encoder data 502 indicating that the wheels are rotating at a speed that does not match within the variance threshold of the rotation of the AMD 104 in the air. The variance threshold may be 10% in one example, but larger or smaller in other examples. After determining the rotation data of the AMD 104 about one or more axes, the process continues to 536.

At 536, the lift detection module 154 determines whether the rotation data indicates a lift. For example, the AMD 104 may be determined to be lifted if either: (1) one or more of the first, second, or third rates of rotation are greater than the rotation threshold, or (2) the difference between the third rate of rotation and the fourth rate of rotation is greater than the variance threshold. For example, the AMD 104 may be determined to be lifted if one of: the first rate of rotation, associated with rotation about the Y-axis, is greater than the rotation threshold; the second rate of rotation, associated with rotation about the X-axis is greater than the rotation threshold; or the third rate of rotation, associated with rotation about the Z-axis, is greater than the rotation threshold. If 536 is reached through 516, then the rotation threshold used is a low threshold-2. If 536 is reached through 520, then the rotation threshold used is a medium threshold-2. If 536 is reached through 522, then the rotation threshold used is a high threshold-2. If the rotation data indicates a lift, then the AMD 104 has been rotated sufficiently to be associated with being lifted from the floor, and the process continues to 538. The rotation threshold may be associated with an amount of expected rotation of the AMD 104 about an axis based on being lifted. If a user 112 lifts the AMD 104, because of weight and a center of mass that is offset from a handle, the AMD 104 may likely rotate along one or more axes. If the AMD 104 is stationary, the amount of rotation of the AMD 104 may likely be less than if the AMD 104 is moving. If the AMD 104 is moving and not suddenly decelerating, the amount of rotation of the AMD 104 may likely be less than if the AMD 104 is suddenly decelerating. If the rotation data does not indicate a lift, then the AMD 104 has not been rotated sufficiently to be considered lifted, and the process continues to 528.

At 538, the lift detection module 154 determines that the AMD 104 has been lifted. In this example, in response to the lift detection module 154 determining that the AMD 104 has been lifted, the AMD 104 may perform one or more operations. For example, the AMD 104 may stop the motor 142, stop wheels or prevent wheels from moving, retract a telescoping mast, move a moveable display into a retracted position, or suspend navigation tasks. The telescoping mast may have a first retracted position, and the moveable display may have second retracted position.

Figure 6:
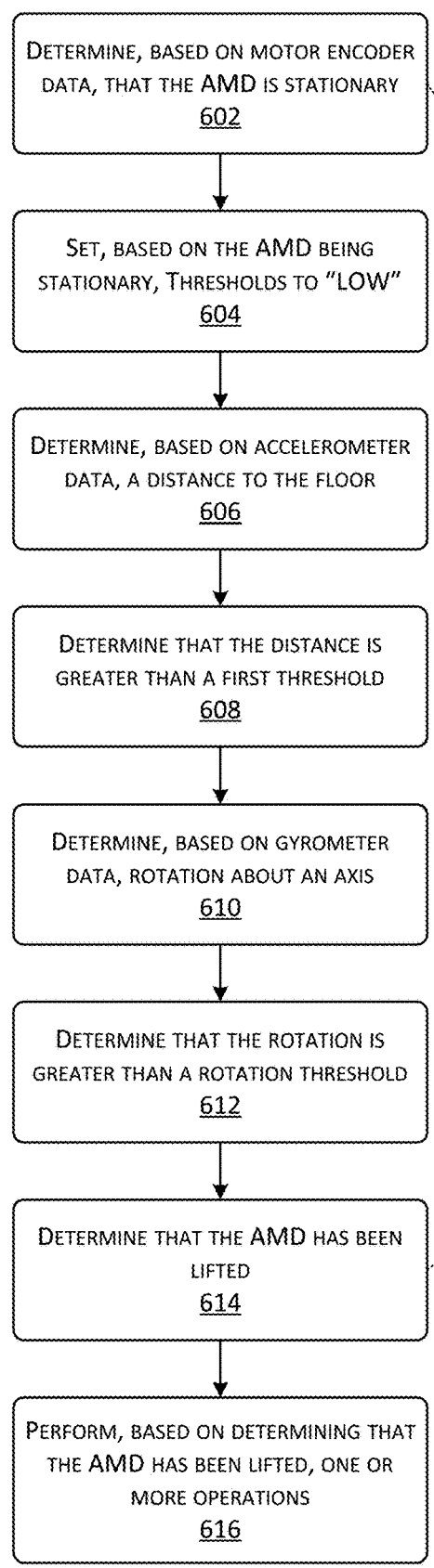
FIG. 6 illustrates a flow diagram for determining that the AMD has been lifted, according to some implementations.
Figure 6:
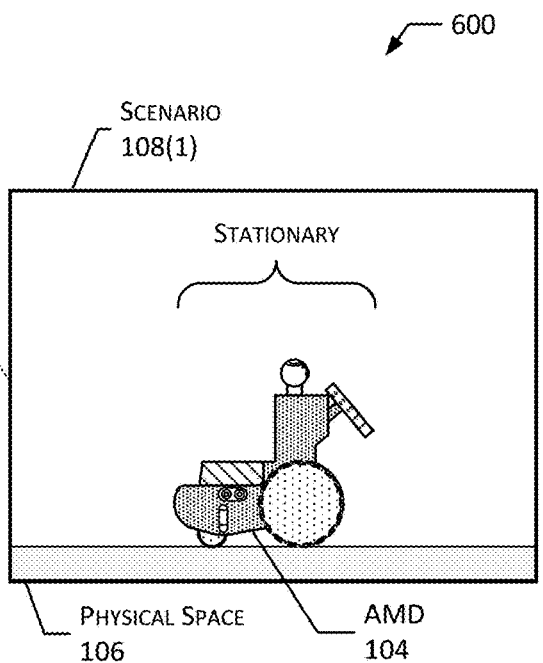
Figure 6:
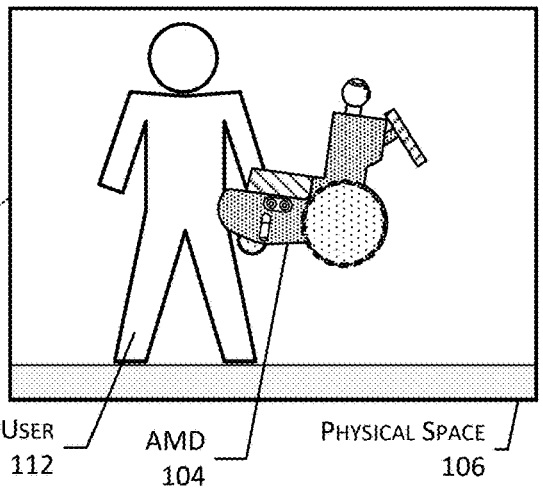

FIG. 6 illustrates a flow diagram 600 for determining that the AMD 104 has been lifted, according to some implementations.

The process represented by the flow diagram 600 may be implemented by the lift detection module 154 described with respect to FIG. 5. In this example, the physical space 106 includes the AMD 104 and the scenario 108(1) is a stationary AMD 104. The lift detection module 154 may use sensor data from one or more sensors, including one or more of: an accelerometer 336 and gyrometer 334. The lift detection module 154 may also use threshold data 120, as described with respect to FIG. 1.

At 602, the lift detection module 154 determines, based on motor encoder data, that the AMD 104 is stationary. For example, a motor encoder 310 may determine motor encoder data used to determine a speed at which the AMD 104 is moving. In this example, the speed of the AMD 104 is zero, and the AMD 104 is stationary.

At 604, the lift detection module 154 may set, based on the AMD 104 being stationary, thresholds to "LOW". For example, the lift detection module 154 may store an indication of which set of threshold data within the threshold data 120 to use with respect to sensor data. As described with respect to FIG. 5, the lift detection module uses sensor data 504 with respect to thresholds for determinations at 518, 526, 532, and 536. Based on whether the thresholds are set to "LOW", "MEDIUM", or "HIGH", as described with respect to threshold data 120, the lift detection module 154 determines whether the AMD 104 has been lifted.

At 606, the lift detection module 154 may determine, based on accelerometer data, a distance to the floor. For example, accelerometer data may be determined periodically by the accelerometer 336. Accelerometer data may indicate upward acceleration over a first time period and a first velocity over the first time period may be determined. Based on the first velocity over the first time period, a distance moved by the AMD 104 upward along the Z-axis may be determined.

At 608, the lift detection module 154 may determine that the distance to the floor is greater than a first threshold. For example, based on the thresholds being set to "LOW", the first threshold for the accelerometer 336 in a stationary scenario 108(1) may be low threshold-1, as described with respect to FIG. 1. In this example, the distance to the floor is greater than the first threshold, low threshold-1.

At 610, the lift detection module 154 may determine, based on gyrometer data, rotation of the AMD 104 about an axis. For example, gyrometer data may be determined periodically by the gyrometer 334. The gyrometer data may indicate angular velocity about one or more axes. The gyrometer data may be used to determine radians rotated by the AMD 140 about the one or more axes. The axis may be a Y-axis, indicating that the AMD 104 has tilted forward or backward. In other examples, other axes or additional axes may be used. For example, the rotation threshold may be with respect to an X-axis, or both the X- and Y-axes.

At 612, the lift detection module 154 may determine that the rotation is greater than a rotation threshold. For example, based on the thresholds being set to "LOW", the rotation threshold in a stationary scenario 108(1) may be low threshold-2, as described with respect to FIG. 1. In this example, the rotation threshold is greater than the rotation threshold, low threshold-2.

At 614, the lift detection module 154 may determine that the AMD 104 has been lifted. For example, the lift detection module 154 may determine that the AMD 104 has been lifted based at least on the distance to the floor being greater than the first threshold and on the rotation of the AMD 104 about an axis being greater than the rotation threshold.

At 616, the AMD 104 may perform, based on determining that the AMD 104 has been lifted, one or more operations. For example, the AMD 104 may stop the motor 142, stop wheels or prevent wheels from moving, retract a telescoping mast, or suspend navigation tasks.

Figure 7:
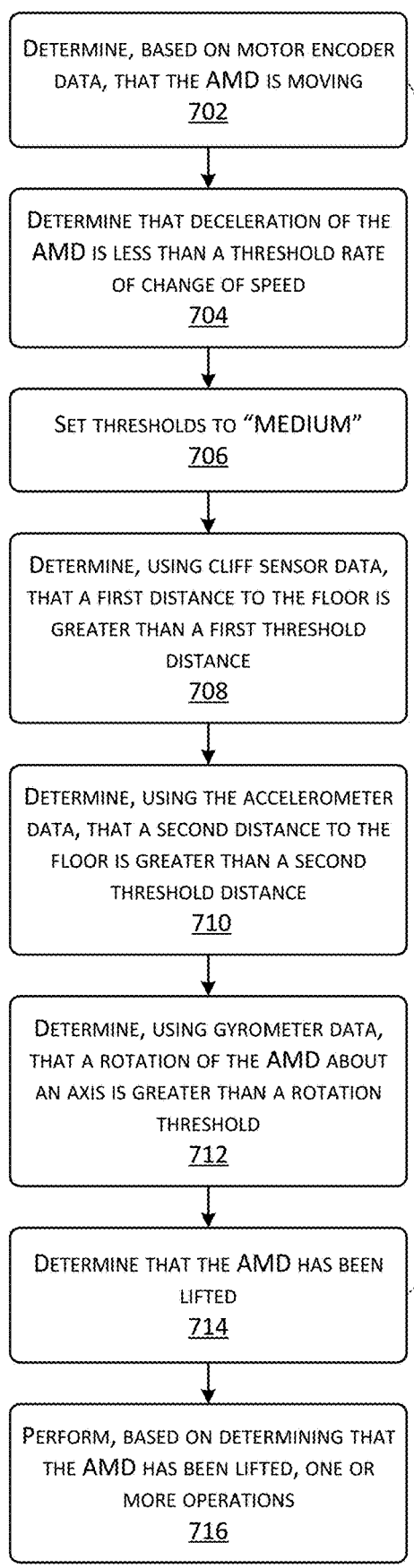
FIG. 7 illustrates a flow diagram for a lift detection module, according to some implementations.
Figure 7:
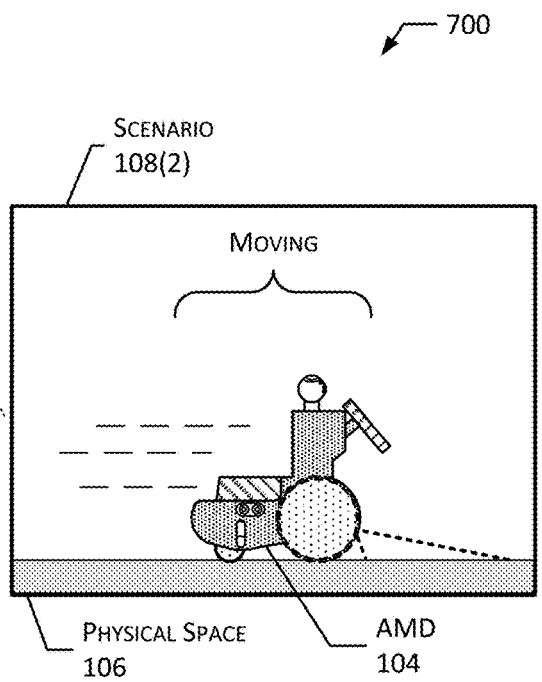
Figure 7:
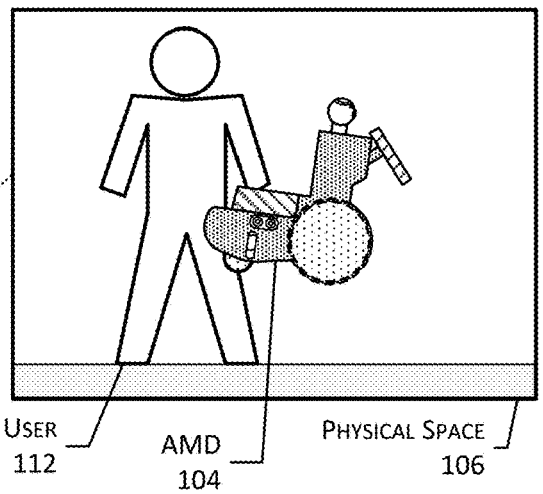

FIG. 7 illustrates a flow diagram 700 for determining that the AMD 104 has been lifted, according to some implementations.

The process represented by the flow diagram 700 may be implemented by the lift detection module 154 described with respect to FIG. 5. In this example, the physical space 106 includes the AMD 104 and the scenario 108(2) is a moving AMD 104. The lift detection module 154 may use sensor data from one or more sensors, including one or more of: an accelerometer 336, a gyrometer 334, and a cliff sensor 374. The lift detection module 154 may also use threshold data 120, as described with respect to FIG. 1.

At 702, the lift detection module 154 may determine, based on motor encoder data, that the AMD 104 is moving. For example, a motor encoder 310 may determine motor encoder data used to determine a speed at which the AMD 104 is moving. In this example, the speed of the AMD 104 is greater than zero.

At 704, the lift detection module 154 may determine that deceleration of the AMD 104 is less than a threshold rate of change of speed. Deceleration may be expressed as a rate of change of speed of the AMD 104, with respect to forward motion. For example, the AMD 104 may be deemed to be decelerating if a first speed indicative of forward movement at a first time is greater than a second speed indicative of forward movement at a second time. As described with respect to FIG. 5, the threshold rate of change of speed may be associated with a rear portion of the AMD 104 rising from the floor due to the momentum of the AMD 104 while the AMD 104 is decelerating. In this example, the threshold rate of change of speed may be 2.75 m/(s*s). The deceleration may be determined based on one or more of the encoder data 502 or accelerometer data from the accelerometer 336.

At 706, the lift detection module 154 may set thresholds to "MEDIUM". For example, the lift detection module 154 may set thresholds to "MEDIUM" based on the AMD 104 moving, but not decelerating at a rate greater than or equal to the threshold rate of change of speed. The lift detection module 154 may store an indication of which set of threshold data within the threshold data 120 to use with respect to sensor data. As described with respect to FIG. 5, the lift detection module uses sensor data 504 with respect to thresholds for determinations at 518, 526, 532, and 536. Based on whether the thresholds are set to "LOW", "MEDIUM", or "HIGH", as described with respect to threshold data 120, the lift detection module 154 determines whether the AMD 104 has been lifted.

At 708, the lift detection module 154 may determine, using cliff sensor data, that a first distance to the floor is greater than a first threshold distance. For example, one or more cliff sensors 374 may determine cliff sensor data periodically and store distance measurements in memory 146. In this example, because the thresholds have been set to "MEDIUM", the first threshold distance may be medium threshold-3, as described with respect to threshold data 120.

At 710, the lift detection module 154 may determine, using the accelerometer data, that a second distance to the floor is greater than a second threshold distance. In this example, because the thresholds have been set to "MEDIUM", the second threshold distance may be medium threshold-1, as described with respect to threshold data 120. As described with respect to FIG. 5, using an acceleration value indicated by the accelerometer data, where the acceleration value is measured over a first time period, the velocity of the AMD 104 may be calculated. The velocity over the first time period may be used to calculate the second distance.

At 712, the lift detection module 154 may determine, using gyrometer data, that a rotation of the AMD 104 about an axis is greater than a rotation threshold. For example, gyrometer data may be determined periodically by the gyrometer 334. The gyrometer data may indicate angular velocity about one or more axes. The gyrometer data may be used to determine radians rotated by the AMD 140 about the one or more axes. The axis may be a Y-axis, indicating that the AMD 104 has tilted forward or backward. In other examples, other axes or additional axes may be used. For example, the rotation threshold may be with respect to an X-axis, or both the X- and Y-axes. In this example, based on the thresholds being set to "MEDIUM", the rotation threshold in a moving scenario 108(2) may be medium threshold-2.

At 714, the lift detection module 154 may determine that the AMD 104 has been lifted. For example, the lift detection module 154 may determine that the AMD 104 has been lifted based at least on the first distance to the floor being greater than the first threshold distance; the second distance to the floor being greater than the second threshold distance; and on the rotation of the AMD 104 about an axis being greater than the rotation threshold.

At 716, the AMD 104 may perform, based on determining that the AMD 104 has been lifted, one or more operations. For example, the AMD 104 may stop the motor 142, stop wheels or prevent wheels from moving, retract a telescoping mast, or suspend navigation tasks.

Figure 8:
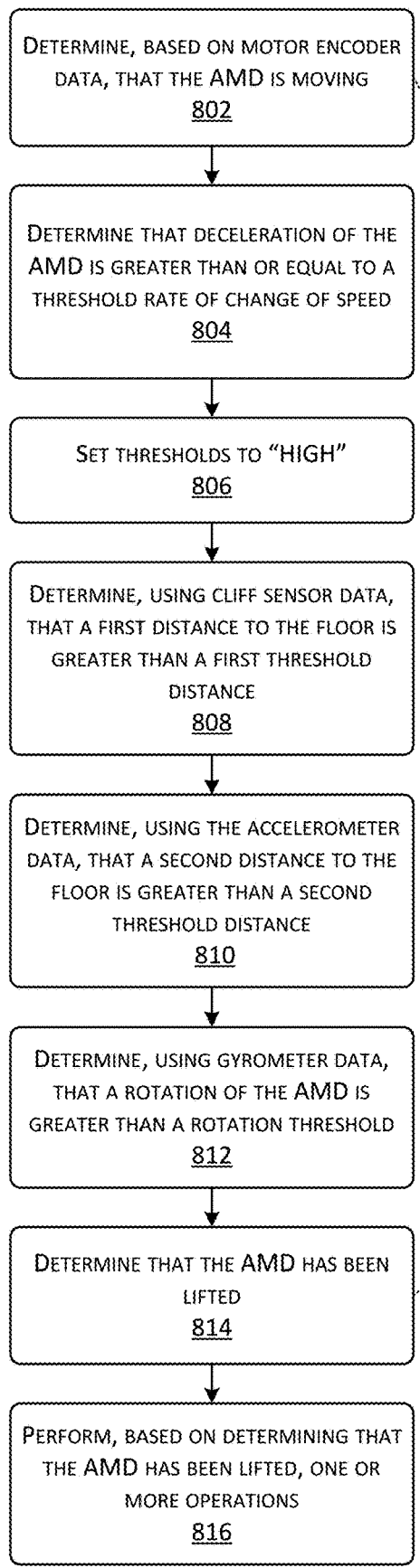
FIG. 8 illustrates a flow diagram for a lift detection module, according to some implementations.
Figure 8:
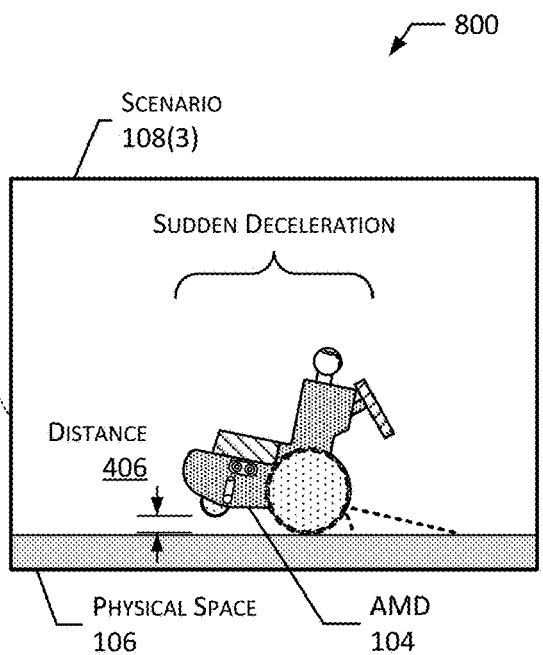
Figure 8:
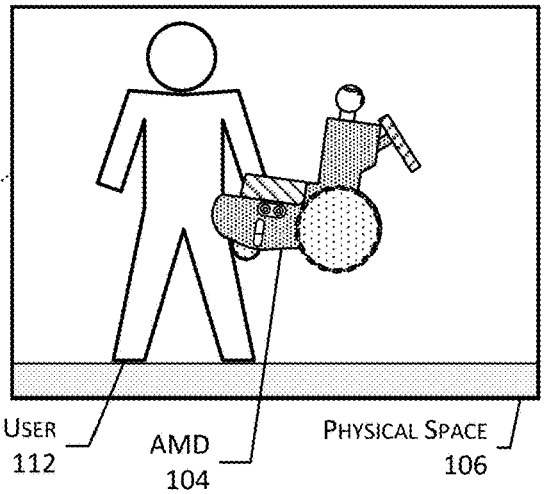

FIG. 8 illustrates a flow diagram 800 for determining that the AMD 104 has been lifted, according to some implementations.

The process represented by the flow diagram 800 may be implemented by the lift detection module 154 described with respect to FIG. 5. In this example, the physical space 106 includes the AMD 104 and the scenario 108(3) is a sudden deceleration of the AMD 104. The lift detection module 154 may use sensor data from one or more sensors, including one or more of: an accelerometer 336, a gyrometer 334, and a cliff sensor 374. The lift detection module 154 may also use threshold data 120, as described with respect to FIG. 1.

At 802, the lift detection module 154 may determine, based on motor encoder data, that the AMD 104 is moving. For example, a motor encoder 310 may determine motor encoder data 502 used to determine a speed at which the AMD 104 is moving, as described above with respect to FIG. 5. In this example, the speed of the AMD 104 is greater than zero.

At 804, the lift detection module 154 may determine that deceleration of the AMD 104 is greater than or equal to a threshold rate of change of speed. For example, as described with respect to FIG. 5, the threshold rate of change of speed may be associated with a rear portion of the AMD 104 rising from the floor by the momentum of the AMD 104 while the AMD 104 is decelerating. In this example, the threshold rate may be 2.75 m/(s*s). The deceleration may be determined based on one or more of the encoder data 502 or accelerometer data from the accelerometer 336.

At 806, the lift detection module 154 may set thresholds to "HIGH". For example, the lift detection module 154 may set thresholds to "HIGH" based on the AMD 104 decelerating at a rate greater than or equal to the threshold rate. The lift detection module 154 may store an indication of which set of threshold data within the threshold data 120 to use with respect to sensor data. As described with respect to FIG. 5, the lift detection module uses sensor data 504 with respect to thresholds for determinations at 518, 526, 532, and 536. Based on whether the thresholds are set to "LOW", "MEDIUM", or "HIGH", as described with respect to threshold data 120, the lift detection module 154 determines whether the AMD 104 has been lifted.

At 808, the lift detection module 154 may determine, using cliff sensor data, that a first distance to the floor is greater than a first threshold distance. For example, one or more cliff sensors 374 may determine cliff sensor data periodically and store distance measurements in memory 146. In this example, because the thresholds have been set to "HIGH", the first threshold distance may be high threshold-3, as described with respect to the threshold data 120.

At 810, the lift detection module 154 may determine, using the accelerometer data, that a second distance to the floor is greater than a second threshold distance. In this example, because the thresholds have been set to "HIGH", the second threshold distance may be high threshold-1, as described with respect to threshold data 120.

At 812, the lift detection module 154 may determine, using gyrometer data, that a rotation of the AMD 104 about an axis is greater than a rotation threshold. For example, gyrometer data may be determined periodically by the gyrometer 334. The gyrometer data may indicate angular velocity about one or more axes. The gyrometer data may be used to determine radians rotated by the AMD 140 about the one or more axes. The axis may be a Y-axis, indicating that the AMD 104 has tilted forward or backward. In other examples, other axes or additional axes may be used. For example, the rotation threshold may be with respect to an X-axis, or both the X- and Y-axes. In this example, based on the thresholds being set to "HIGH", the rotation threshold in a stationary scenario may be high threshold-2.

At 814, the lift detection module 154 may determine that the AMD 104 has been lifted. For example, the lift detection module 154 may determine that the AMD 104 has been lifted based at least on: the first distance to the floor being greater than the first threshold distance; the second distance to the floor being greater than the second threshold distance; and on the rotation of the AMD 104 about an axis being greater than the rotation threshold.

At 816, the AMD 104 may perform, based on determining that the AMD 104 has been lifted, one or more operations. For example, the AMD 104 may stop the motor 142, stop wheels or prevent wheels from moving, retract a telescoping mast, or suspend navigation tasks.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An autonomous mobile device (AMD) comprising:
   one or more wheels;
   one or more sensors;
   one or more memories storing computer-executable instructions; and
   one or more processors to execute the computer-executable instructions to:
      determine a movement scenario for the AMD, wherein the movement scenario is one of:
         stationary,
         in motion, or
         decelerating;
      set a first threshold and a second threshold, based on the movement scenario for the AMD;
      determine, based on the one or more sensors, a first distance value indicating a vertical distance traveled by the AMD;
      determine that the first distance value is greater than the first threshold;
      determine, using the one or more sensors, rotation data indicative of rotation of the AMD around one or more axes;
      determine, based on the rotation data, that a first rotation around a first axis is greater than the second threshold;
      determine, based at least on the first distance value being greater than the first threshold and on the first rotation being greater than the second threshold, first data indicative of the AMD having been lifted; and
      perform, based on the first data, one or more operations, wherein the one or more operations comprise one or more of:
         stopping a motor of the AMD,
         disconnecting power from the motor of the AMD,
         stopping the one or more wheels of the AMD from moving,
         preventing the one or more wheels of the AMD from moving,
         retracting an extensible mast of the AMD,
         moving a moveable display of the AMD into a retracted position, or
         suspending one or more navigation tasks of the AMD.

2. The AMD of claim 1, wherein the one or more sensors comprise one or more of:
   an accelerometer,
   a gyrometer,
   a time-of-flight sensor,
   a camera, or
   an altimeter.

3. The AMD of claim 1, wherein the one or more sensors comprise a time-of-flight sensor, and wherein the one or more processors further execute the computer-executable instructions to:
   determine, using the time-of-flight sensor, a second distance value associated with a distance between a bottom of the AMD and a floor;
   determine that the second distance value is greater than a third threshold; and
   determine, further based on the second distance value being greater than the third threshold, that the first data is indicative of the AMD having been lifted.

4. The AMD of claim 1, wherein the one or more sensors comprise a plurality of cliff sensors, and wherein the one or more processors further execute the computer-executable instructions to:
   determine, using the plurality of cliff sensors, a plurality of distance values; and
   determine that the first data is indicative of the AMD having been lifted based on one of:
      each of the plurality of distance values being less than a third threshold, or
      at least one of the plurality of distance values being greater than a fourth threshold, wherein the third threshold is less than the fourth threshold.

5. The AMD of claim 1, further comprising:
   the extensible mast; and
   the moveable display;
   wherein to perform the one or more operations, the one or more processors further execute the computer-executable instructions to:
   move the extensible mast into a first position; and
   move the moveable display into a second position.

6. The AMD of claim 1, wherein the one or more sensors comprise an accelerometer; and
   wherein the first threshold is based on one of:
      the AMD being stationary;
      the AMD being in motion and decelerating at a rate that is less than a deceleration threshold; or
      the AMD being in motion and decelerating at a rate that is greater than or equal to the deceleration threshold.

7. The AMD of claim 1, wherein the one or more processors further execute the computer-executable instructions to:
   determine a rate of deceleration of the AMD; and
   determine that the rate of deceleration is greater than a deceleration threshold;
   wherein the first threshold is based on the movement scenario being decelerating, and wherein the movement scenario being decelerating is determined based on the rate of deceleration being greater than the deceleration threshold.

8. The AMD of claim 1, further comprising:
   one or more speakers;

wherein the one or more processors further execute the computer-executable instructions to:
  determine that the one or more speakers are emitting sound;
  wherein the first threshold is based on the one or more speakers emitting sound.

9. The AMD of claim 1, wherein the one or more sensors comprise a gyrometer, wherein the AMD further comprises a motor encoder, and wherein the one or more processors further execute the computer-executable instructions to:
  determine, based on gyrometer data, a first rate of rotation of the AMD about a Z-axis;
  determine, based on encoder data, a second rate of rotation of the AMD about the Z-axis; and
  determine that a difference between the first rate of rotation and the second rate of rotation is greater than a third threshold;
  wherein, further based on the difference between the first rate of rotation and the second rate of rotation being greater than the third threshold, the first data is indicative of the AMD having been lifted.

10. The AMD of claim 1, the one or more processors to further execute the computer-executable instructions to:
  associate the movement scenario of stationary with a low-level first threshold and low-level second threshold;
  associate the movement scenario of in motion with a medium-level first threshold and a medium-level second threshold; and
  associate the movement scenario of decelerating with a high-level first threshold and a high-level second threshold.

11. A method comprising:
  determining a movement scenario for an autonomous mobile device (AMD), wherein the movement scenario is one of:
    stationary,
    in motion, or
    decelerating;
  setting a first threshold and a second threshold, based on the movement scenario for the AMD;
  determining, based on one or more sensors, a first distance value indicating a vertical distance traveled by the AMD;
  determining that the first distance value is greater than the first threshold;
  determining, using the one or more sensors, rotation data indicative of rotation of the AMD around one or more axes;
  determining, based on the rotation data, that a first rotation around a first axis is greater than the second threshold;
  determining, based at least on the first distance value being greater than the first threshold and on the first rotation being greater than the second threshold, first data indicative of the AMD having been lifted; and
  performing, based on the first data, one or more operations, wherein the one or more operations comprise one or more of:
    stopping a motor of the AMD,
    disconnecting power from the motor,
    stopping one or more wheels of the AMD from moving,
    preventing the one or more wheels of the AMD from moving,
    stopping one or more mechanical legs of the AMD,
    retracting the one or more mechanical legs of the AMD,
    retracting an extensible mast of the AMD,
    moving a moveable display of the AMD into a retracted position, or
    suspending one or more navigation tasks of the AMD.

12. The method of claim 11, further comprising:
  determining, using a time-of-flight sensor, a second distance value associated with a distance between a bottom of a chassis of the AMD and a floor;
  determining that the second distance value is greater than a third threshold; and
  determining, further based on the second distance value being greater than the third threshold, that the first data is indicative of the AMD having been lifted.

13. The method of claim 11, further comprising:
  determining that one or more speakers of the AMD are emitting sound at a first output power; and
  wherein the first threshold is based on the first output power.

14. The method of claim 11, further comprising:
  associating the movement scenario of stationary with a low-level first threshold and low-level second threshold;
  associating the movement scenario of in motion with a medium-level first threshold and a medium-level second threshold; and
  associating the movement scenario of decelerating with a high-level first threshold and a high-level second threshold.

15. A device comprising:
  one or more sensors;
  one or more memories storing computer-executable instructions; and
  one or more processors to execute the computer-executable instructions to:
    determine a movement scenario for the device, wherein the movement scenario is one of:
      stationary,
      in motion, or
      decelerating;
    set a first threshold and a second threshold, based on the movement scenario for the device;
    determine, based on the one or more sensors, a first distance value indicating a vertical distance traveled by the device;
    determine that the first distance value is greater than the first threshold;
    determine, using the one or more sensors, rotation data indicative of rotation of the device around one or more axes;
    determine, based on the rotation data, that a first rotation around a first axis is greater than the second threshold;
    determine, based at least on the first distance value being greater than the first threshold and on the first rotation being greater than the second threshold, first data indicative of the device having been lifted; and
    perform, based on the first data, one or more operations, wherein the one or more operations comprise one or more of:
      stopping a motor of the device,
      disconnecting power from the motor of the device,
      stopping one or more wheels of the device from moving,
      preventing the one or more wheels for the device from moving,
      stopping one or more mechanical legs of the device,
      retracting the one or more mechanical legs of the device, retracting an extensible mast of the device,
moving a moveable display of the device into a retracted position, or
suspending one or more navigation tasks of the device.

16. The device of claim 15, wherein the one or more sensors comprise a time-of-flight sensor, and wherein the one or more processors further execute the computer-executable instructions to:
determine, using the time-of-flight sensor, a second distance value associated with a distance between a bottom of a chassis of the device and a floor;
determine that the second distance value is greater than a third threshold; and
determine, further based on the second distance value being greater than the third threshold, that the first data is indicative of the device having been lifted.

17. The device of claim 15, wherein the one or more sensors comprise one or more of:
an accelerometer,
a gyrometer,
a time-of-flight sensor,
a camera, or
an altimeter.

18. The device of claim 15, further comprising:
the motor; and
a motor encoder;
wherein the one or more processors further execute the computer-executable instructions to:
determine, based on the motor encoder, second data indicative of rotation of the motor;
determine, based on the second data, that the motor is rotating; and
stop the motor.

19. The device of claim 15, further comprising:
the extensible mast; and
the moveable display;
wherein to perform the one or more operations, the one or more processors further execute the computer-executable instructions to:
move the extensible mast into a first position; and
move the moveable display into a second position.

20. The device of claim 15, further comprising:
one or more speakers;
wherein the one or more processors further execute the computer-executable instructions to:
determine that the one or more speakers are emitting sound;
wherein the first threshold is based on the one or more speakers emitting sound.

* * * * *